United States Patent [19]
Suzuki

[11] Patent Number: 5,974,175
[45] Date of Patent: Oct. 26, 1999

[54] IMAGE PROCESSING APPARATUS AND METHOD FOR DETECTING A CONTOUR OF AN OBJECT FROM IMAGES OF A MOTION PICTURE AND EXTRACTING THE OBJECT THEREFROM

[75] Inventor: Shoji Suzuki, Kawasaki, Japan

[73] Assignee: Fujitsu Limited, Kawasaki, Japan

[21] Appl. No.: 08/923,522

[22] Filed: Sep. 4, 1997

[30] Foreign Application Priority Data

Jan. 22, 1997 [JP] Japan ................................. 9-009807

[51] Int. Cl.⁶ ....................................................... G06K 9/48
[52] U.S. Cl. ........................... 382/199; 382/103; 382/266
[58] Field of Search .................................. 382/103, 199, 382/190, 203, 206, 260, 266; 348/26, 135, 169, 170, 171, 172, 700; 358/518, 520, 524

[56] References Cited

U.S. PATENT DOCUMENTS

| 5,099,322 | 3/1992 | Gove ........................................ 358/105 |
| 5,359,712 | 10/1994 | Cohen et al. ............................ 395/161 |
| 5,475,507 | 12/1995 | Suzuki et al. ........................... 358/500 |
| 5,596,659 | 1/1997 | Normile et al. ........................ 382/253 |
| 5,649,030 | 7/1997 | Normile et al. ........................ 382/253 |
| 5,703,965 | 12/1997 | Fu et al. .................................. 382/232 |
| 5,767,922 | 6/1998 | Zabih et al. ............................ 348/700 |
| 5,768,413 | 6/1998 | Levin et al. ............................ 382/173 |

FOREIGN PATENT DOCUMENTS

| 6-203157 | 7/1994 | Japan .............................. G06F 15/70 |
| 7-320068 | 12/1995 | Japan ................................ G06T 9/20 |

*Primary Examiner*—Matthew C. Bella
*Attorney, Agent, or Firm*—Staas & Halsey, LLP

[57] ABSTRACT

An image processing apparatus detects a contour of an object from a sequence of images. The images include a first image containing the object and subsequent images containing the object. The apparatus includes a first contour detection unit and a second contour detection unit. The first contour detection unit detects contour points which determine the contour of the object of the first image, when the first image and points near boundary locations of the object of the first image are specified by a user. The second contour detection unit detects contour points of one of the subsequent images based on the contour points detected by the first contour detection unit, so that object-contour data with respect to one of the subsequent images is determined.

13 Claims, 18 Drawing Sheets

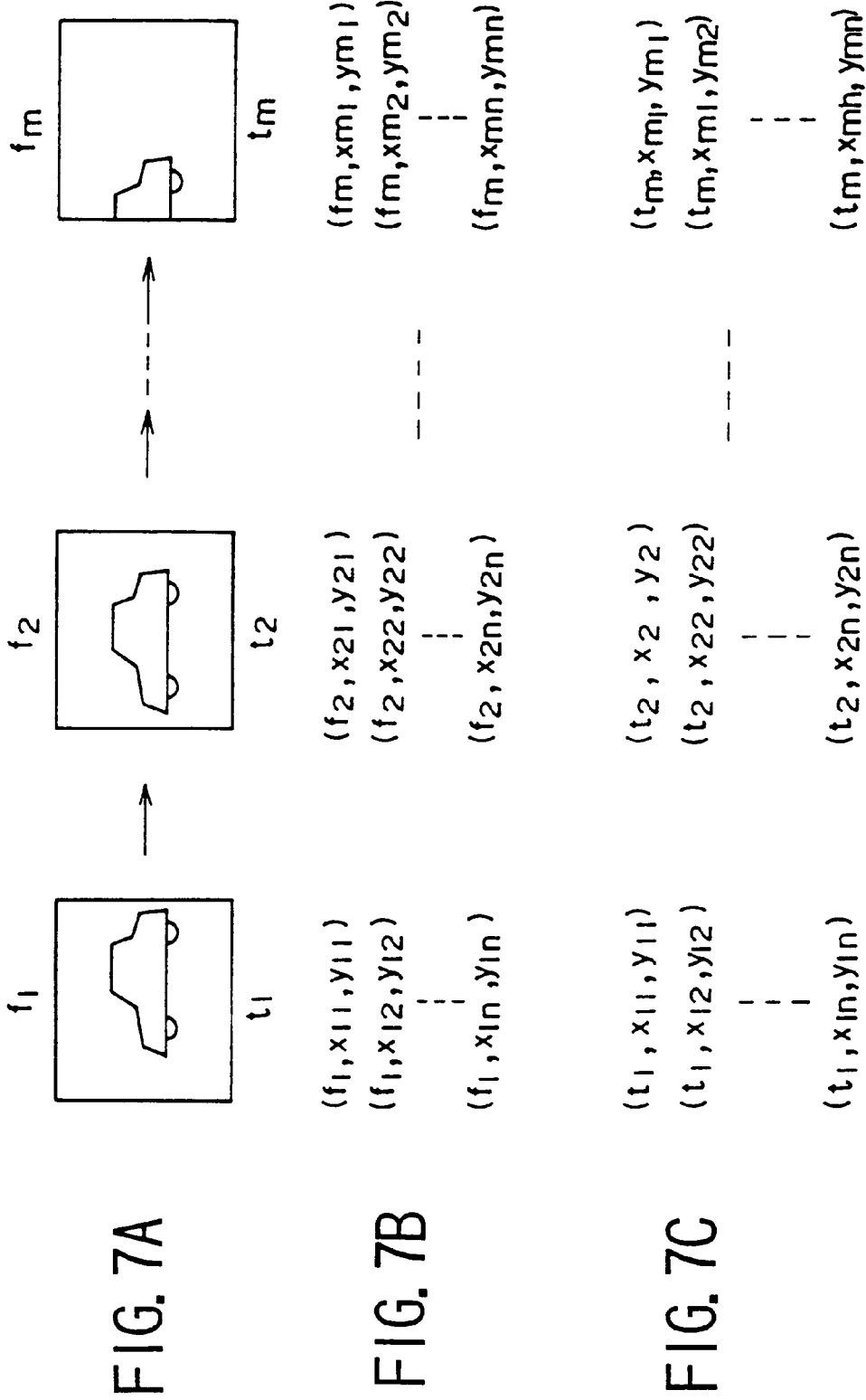

IMAGE PROCESSING APPARATUS AND METHOD FOR DETECTING A CONTOUR OF AN OBJECT FROM IMAGES OF A MOTION PICTURE AND EXTRACTING THE OBJECT THEREFROM

BACKGROUND OF THE INVENTION (1) Field of the Invention

The present invention relates to an image processing apparatus and method that is capable of extracting a desired object from a sequence of images of a motion picture on the basis of a detected contour of the object while requiring only a simple operation from the operator.

Recently, low-cost, high-performance personal computers and memories have come into widespread use, which enables easy manipulation of image data of a color image or a motion picture by the operator of the personal computer. To create a motion picture that is viewed by other users on the personal computers for advertisement uses, educational uses, or entertainment uses, there is an increasing demand for a tool which is capable of editing images of the motion picture while only requiring a simple operation from the operator.

Editing the images of a motion picture involves several image processing processes, such as object-contour detection, object extraction, color-changing, enlargement, reduction, transfiguration, composition and/or recognition. The first process that is performed at the beginning of these image processing processes is a detection of a contour of a desired object (for example, an automobile or a human being) from image frames of a motion picture. In particular, the present invention relates to such an image processing apparatus and method which is capable of extracting a desired object from a sequence of image frames of a motion picture on the basis of a detected contour of the object.

(2) Description of the Related Art

U.S. Pat. No. 5,475,507 (corresponding to Japanese Laid-Open Patent Application No.6-203157), which is assigned to the assignee of the present invention, discloses a color image processing method which detects a contour of a desired object in a color image containing only stationary components.

In the method of the above-mentioned publication, when the operator has designated a point at a position near the contour of the desired object in the image being processed, a boundary point on the contour of the object is detected on the basis of the designation. From the detected boundary point, other points on the object-contour are subsequently detected to detect the object-contour.

However, the method of the above-mentioned publication is intended to detect the object-contour from the image containing only stationary components. If this method is applied to the detection of the object-contour in a sequence of image frames of a motion picture, the operator must designate a point at a position near the contour of the object in a related image being processed for every image frame of the motion picture. Such an image processing method requires unnecessary redundant operations from the operator, and the operability is considerably low.

Further, Japanese Laid-Open Patent Application No.7-320068 (corresponding to Japanese Patent Application No.6-109914) discloses an image processing method for detecting an edge of an outline of a desired object from a sequence of image frames of a motion picture and detecting the object-contour on the basis of the detected edge.

In the method of the above-mentioned publication, an average of density levels of neighboring picture elements at an edge of the object-contour of a preceding image frame is detected. A threshold level which is used to detect a corresponding edge of the object-contour of a following image frame is determined by the average of the density levels for the preceding image frame.

The object-contour detection method of the above-mentioned publication involves two basic methods: one utilizing a motion of the object to separate the object-contour from the background region in the image frames (which is called a motion-based contour detection), and the other utilizing a color of the object to detect the object-contour in the image frames (which is called a color-based contour detection).

In the motion-based contour detection of the above-mentioned publication, a reference image containing only stationary components is compared with a subsequent image having the same environment but including a moving object. This comparison results in the difference of the two images canceling the stationary components, leaving only nonzero entries that correspond to the nonstationary image components. However, the essential requirement of this method is that there is an appreciable difference in the two images with respect to the moving object included therein. If there is no difference in the two images with respect to the moving object, this method cannot detect the contour of the desired object and the reliability of the detection is low. Further, if there is another moving object different than the desired moving object in the motion picture, this method may detect the contours of both the moving objects, and the reliability of the detection is low.

On the other hand, in the color-based contour detection of the above-mentioned publication, only color values of pixels of the desired object are detected to detect the object-contour in the image frames. However, the essential requirement of this method is that there is an appreciable difference between the color of the object and the color of the background. If there is no appreciable color difference of the object and the background, this method cannot detect the contour of the object of interest and the reliability of the detection is low.

SUMMARY OF THE INVENTION

An object of the present invention is to provide an improved image processing apparatus and method in which the above-mentioned problems are eliminated.

Another object of the present invention is to provide an image processing apparatus and method which is capable of detecting a contour of a desired object from a motion picture and extracting the object from the motion picture with accuracy and reliability while requiring only a simple operation from the operator.

In an image processing apparatus according to the present invention, a contour of an object is detected from a sequence of images wherein the images include a first image containing the object and subsequent images containing the object, the image processing apparatus comprising: a first contour detection unit which detects contour points which determine a contour of the object of the first image, when the first image and points adjacent boundary locations of the object of the first image are specified by a user; and a second contour detection unit which detects contour points of one of the subsequent images based on the contour points detected by the first contour detection unit, so that object-contour data with respect to one of the subsequent images is determined.

According to the present invention, a contour of an object is detected from a sequence of images wherein the images include a first image containing the object and a second image containing the object, by the following steps: a first step wherein, when points adjacent boundary locations of the object of the first image are specified by a user, a first detection range in the first image is set for each of the specified points; a second step wherein a boundary point within each of the first detection ranges set in the first step is detected; a third step wherein a contour point on the object-contour of the first image is detected based on two of the boundary points detected in the second step, so that the object-contour of the first image is determined by the contour points detected for all the boundary points; a fourth step wherein a second detection range in the second image is set for each of the contour points detected in the third step with respect to the first image, the second detection range being placed at a point corresponding to coordinates of one of the detected contour points; a fifth step wherein a contour point within each of the second detection ranges set in the fourth step is detected; and a sixth step wherein the contour of the object of the second image is detected by the contour points detected in the fifth step.

In the present invention, the contour of a preceding-frame object and the contour of a following-frame object are adjacent to each other in the image of the following frame. The contour points of the object of the preceding frame are always located near the contour of the same object of the following frame. Therefore, it is possible to detect the following-frame contour point within a detection range with accuracy and reliability by setting the detection range within the following frame at one of the preceding-frame contour points. Further, according to the present invention, when detecting the contour of a desired object from image frames of a motion picture, unnecessary redundant operations by the operator are not needed. Only the frame and object boundary specification for the first frame is given by the operator, and the contour detection for all the frames is automatically carried out by the computer operations.

With an image processing apparatus and a method for the same having the above-mentioned arrangement, it is possible to automatically detect the contour of a desired object in images of a motion picture through a simple designation by the operator and computer operations based on the designation. Then, the object can be extracted by uniformly applying prescribed image data to, for example, the inside of the detected contour. In this way, high-precision object-contour detection and object extraction is possible with a simple operation from the operator. Accordingly, the operability of the entire image processing can be greatly improved.

BRIEF DESCRIPTION OF THE DRAWINGS

The above and other objects, features and advantages of the present invention will become more apparent from the following detailed description when read in conjunction with the accompanying drawings in which:

FIGS. 7A, 7B and 7C are diagrams for explaining methods for management of object-contour data obtained by the object-contour detection process;

DESCRIPTION OF THE PREFERRED EMBODIMENTS

A description will now be given of the preferred embodiments of the present invention with reference to the accompanying drawings.

Figure 2:
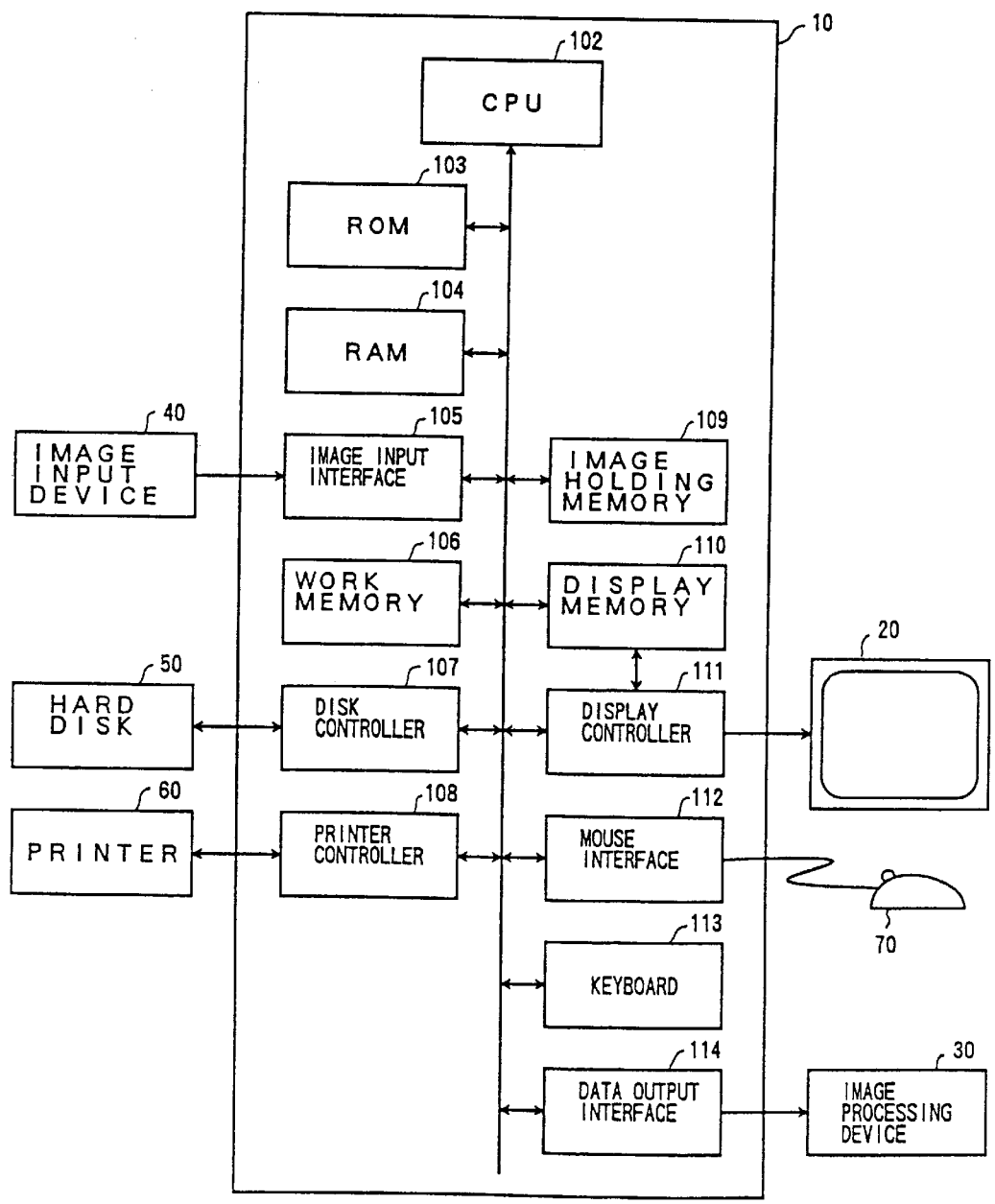
FIG. 2 is a block diagram showing a hardware configuration according to the present invention.

FIG. 2 shows an embodiment of an image processing apparatus for carrying out image processing and object extraction according to the present invention. The apparatus has an image processing system 10 which includes a CPU (central processing unit) 102 as a controlling means. An internal bus 101 extends from the CPU 102 to various elements of the image processing system 10. A ROM (read only memory) 103 is connected with the internal bus 101 and permanently stores control programs for performing image processing and object extraction according to the present invention. A RAM (random access memory) 104 is used as a controlled storage of the CPU 102, and is provided to temporarily store data necessary for the detection of the contour of an object or the extraction of the object.

An image input interface 105 is provided to connect the image processing system 10 with an external image input device 40 so that image data of a motion picture can be input to the system 10. The image data input through the image input interface 105 is stored in an image holding memory 109. A work memory 106 is provided to develop a desired portion of the image data stored in the image holding memory 109, so as to perform object-contour detection or object extraction. A display memory 110 stores image data which is to be displayed through a display controller 111 onto a color display 20.

A disk controller 107 is connected with a hard disk 50 serving as an external storage. A printer controller 108 is connected with an external printer 60 for controlling the printer 60. A mouse 70 is connected with a mouse interface 112, so that, when an input image is displayed on the color display 20, each designation for object-contour detection or object extraction can be input by setting a cursor on the displayed image. A keyboard 113 is provided for delivering various inputs to the image processing system 10. A data output interface 114 is connected with an external image processing device 30 so that object extraction data obtained by the image processing system 10 can be sent to the image processing device 30. In the image processing device 30, necessary processing steps, such as color-changing, enlargement, reduction, transfiguration, composition and/or recognition, are performed after object extraction.

Figure 1:
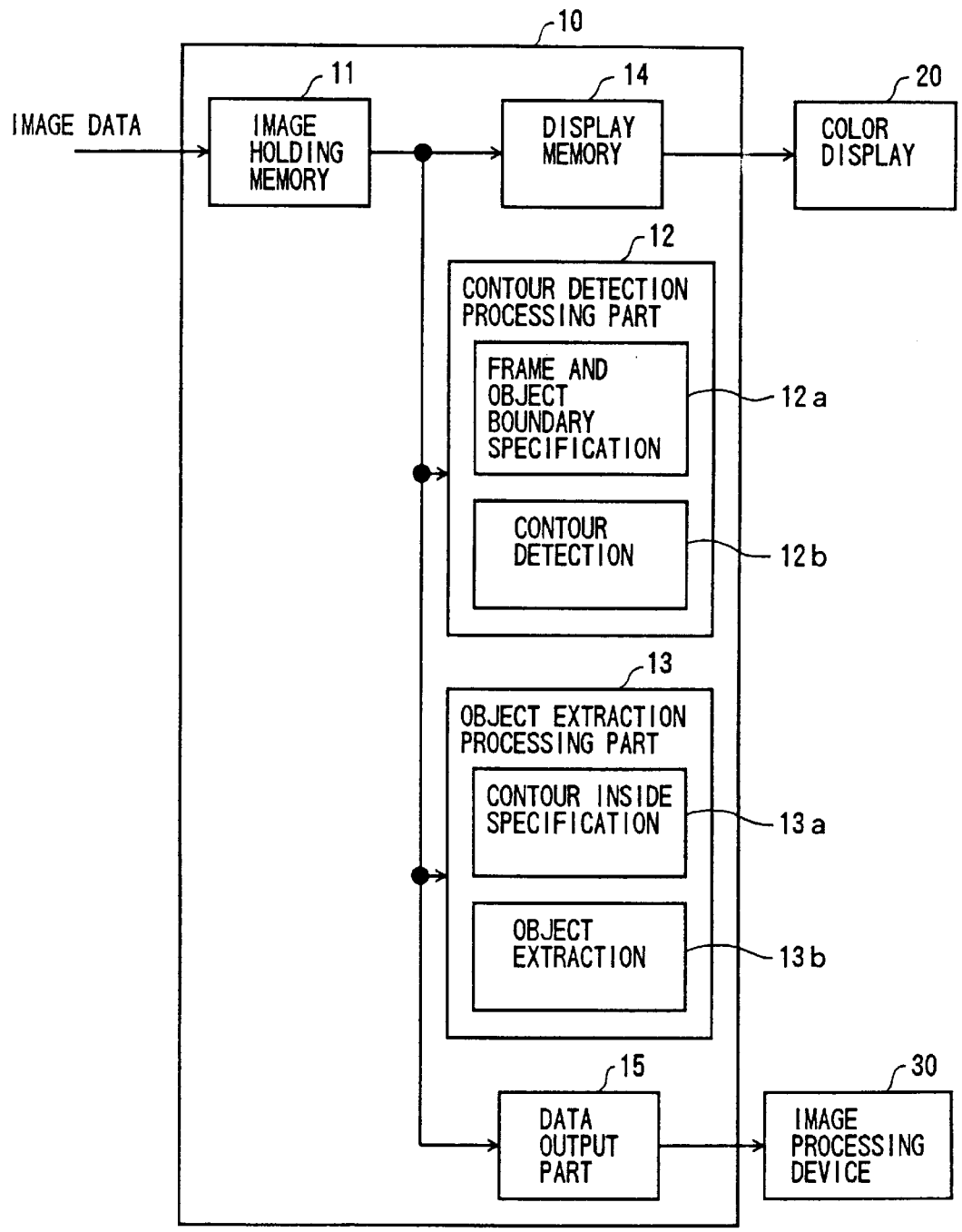
FIG. 1 is a block diagram showing various functions featured according to the present invention.

FIG. 1 shows various functions provided in the image processing system 10 for performing object-contour detection and object extraction according to the present invention. Two major parts, that is, a contour detection processing part 12 and an object extraction processing part 13, are provided in the image processing system 10 to perform the relevant functions under program-control by the CPU 102. The contour detection processing part 12 comprises a frame and object boundary specification unit 12a and a contour detection unit 12b. The object extraction processing part 13 comprises a contour inside specification unit 13a and an object extraction unit 13b.

In the image processing system 10 of FIG. 1, an image holding memory 11 which is essentially the same as the image holding memory 109 of FIG. 2 is provided. A display memory 14 which is essentially the same as the display memory 110 of FIG. 2 is provided in the image processing system 10. Further, a data output part 15 which is essentially the same as the data output interface 114 of FIG. 2 is provided in the image processing system 10.

The fundamental processing functions for performing object-contour detection and object extraction will be described with reference to FIG. 1. Image data including a sequence of image frames (stationary images) contained in a motion picture is supplied from the image input device 40. The image data is stored in the image holding memory 11. The image data stored in the image holding memory 11 is sent, with no substantial change in the image data, to the display memory 14, and then displayed on the color display 20. As the input image data stored in the image holding memory 11 includes a large quantity of image data including the image frames of the motion picture, only a portion of the stored images is sent to the display memory 14, and then the portion of the stored images is displayed on the color display 20.

When the images are displayed on the color display 20, the operator uses the function of the frame and object boundary specification unit 12a to specify a particular frame of the displayed images and a point near a boundary location of a desired object of the specified frame. When the operator has specified the frame and the point near the object boundary location, the frame and object boundary specification unit 12a receives data of the specified frame and the specified point. The contour detection unit 12b operates to detect a contour of the desired object in the image of the specified frame by using the data from the frame and object boundary specification unit 12a.

When the contour detection unit 12b has detected the contour of the object, the object-contour is stored in the display memory 14, and then displayed, as the results of the detection, on the color display 20. When the object-contour which has been detected from the input images is displayed on the color display 20, the operator uses the functions of the object extraction processing part 13.

Specifically, the operator uses the function of the object inside specification unit 13a to specify the inside of the object-contour displayed on the color display 20. When the operator's specification has been given, the object inside specification unit 13a receives data of the specification by the operator. The object extraction unit 13b performs an object extracting operation by uniformly filling either the inside or the outside of the contour with prescribed image data, so that data of coordinates within the contour are obtained as the results of the object extraction. The results of the object extraction on the basis of the detection of the object-contour are sent to the display memory 14, and are displayed on the color display 30.

The object extraction results are also sent through the data output part 15 to the image processing device 30. The data output to the image processing device 30 through the data output part 15 is used in various image processing processes, such as color-changing, enlargement, reduction, transfiguration, composition and/or recognition, which are performed by the image processing device 30.

Figure 3:
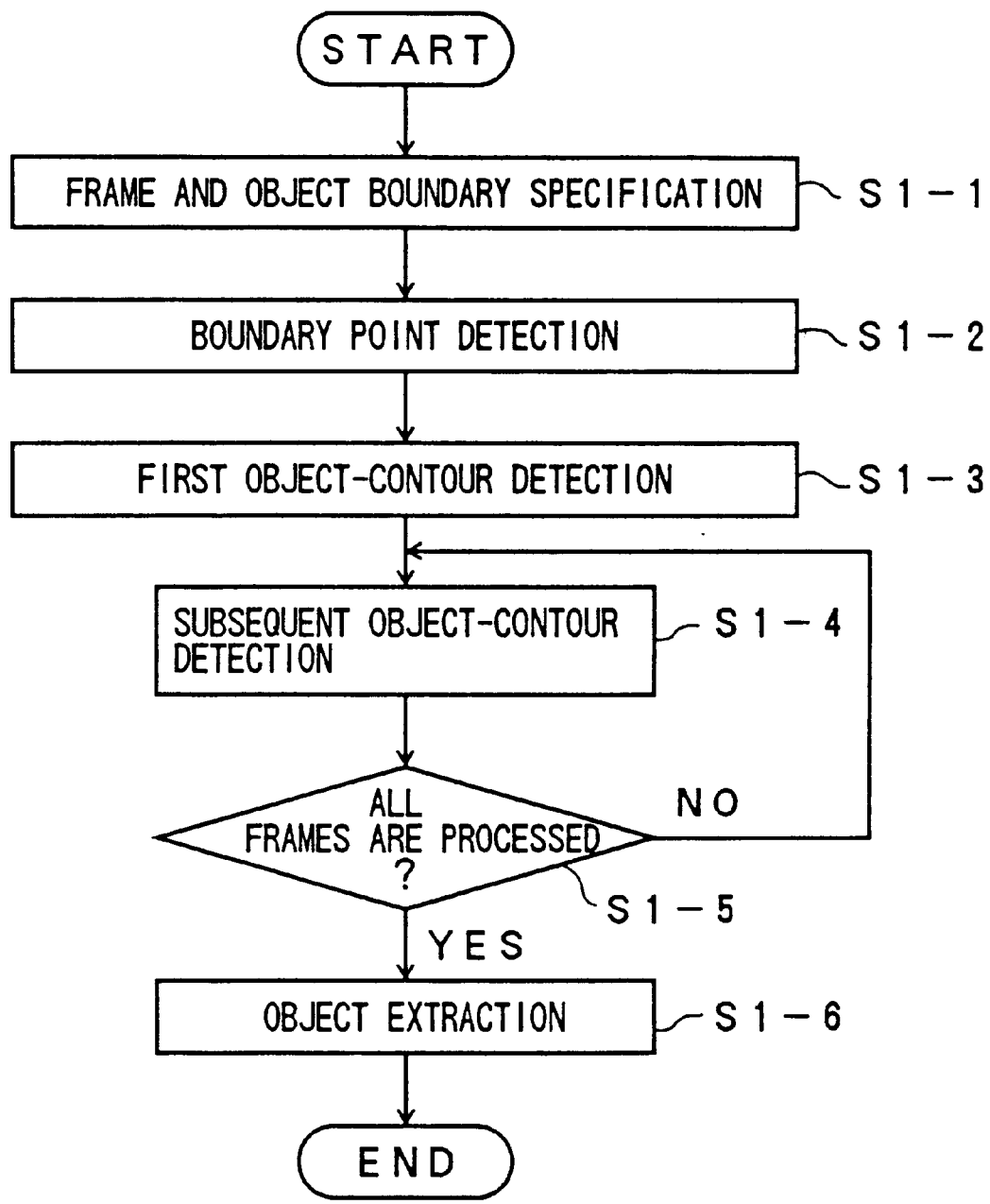
FIG. 3 is a flowchart for explaining basic processes of a first embodiment of object-contour detection and object extraction according to the present invention.

FIG. 3 shows basic processes of object-contour detection and object extraction processing according to the present invention. The processes shown in FIG. 3 are performed under program-control by the CPU 102.

First, the operator uses the mouse 70 to click a particular button (not shown) of toolbars displayed on the color display 20 and to select the input image data of the image holding memory 11, from which a desired object is to be extracted. When the button is clicked with the mouse 70 and the image data is selected by the operator, the object-contour detection and object extraction processes of FIG. 3 are started by the CPU 102.

As shown in FIG. 3, when the object-contour detection and object extraction has been started, the CPU 102 at step S1-1 performs a frame and object boundary specification process. In the step S1-1, the CPU 102 stores a predetermined number of image frames of the input image data in the display memory 14. These frames are then displayed on the color display 20 as shown in FIG. 4.

Figure 4:
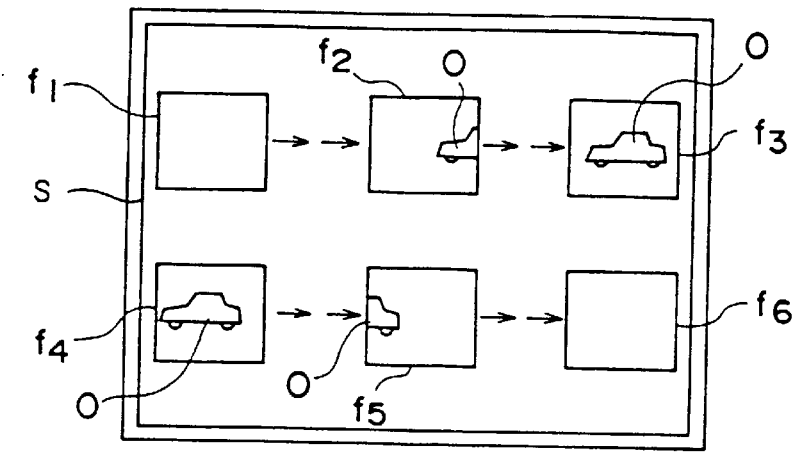
FIG. 4 is a diagram for explaining a frame and object boundary specification process.

In FIG. 4, "S" indicates a designation screen displayed on the color display 20, and "O" indicates a desired object to be extracted. As shown in FIG. 4, six frames f1 through f6 of the selected image data are sequentially arrayed and displayed in rows and columns on the designation screen "S".

When the frames f1 through f6 have been displayed on the color display 20, the operator specifies a particular frame of the displayed frames and a point near a boundary location of a desired object of the specified frame by using the mouse 70. By viewing the frames f1 through f6 of the designation screen "S" on the color display 20, it is easily appreciable to the operator that some frames fully contain the object "O" and others partially contain the object "O" or contain no object "O".

In the example of FIG. 4, the frames f2 and f5 partially contain the object "O", the frames f3 and f4 fully contain the object "O", and the frames f1 and f6 do not contain the object "O". This is easily apparent to the operator by viewing the designation screen "S". Therefore, the frame specification can be easily and efficiently performed by the operator. In the step S1-1, a particular frame in which the object "O" is fully contained is specified by the operator by setting the cursor of the mouse 70 on the frame and clicking it with the mouse 70. When a particular frame has been specified by the operator, the image of the frame is enlarged and only the image of the frame is displayed on the whole designation screen "S" by the CPU 102 as shown in FIG. 5A.

In the above embodiment, only one frame among the frames f1 through f6 of the designation screen "S" is specified by the operator. Alternatively, two or more frames may be specified so that an object boundary specification for each of the specified frames may be performed to detect a contour of the object therein. For example, suppose that the stored image data contains 100 image frames of a motion picture. In this case, a 1st frame and a 50th frame may be specified by the operator, and a contour of the object may be detected by the specification of each of the 1st frame and the 50th frame. An object-contour detection with respect to the 2nd through 49th frames can be carried out on the basis of a detected object-contour obtained from the specification of the 1st frame. An object-contour detection for the 51th through 100th frames can be carried out on the basis of a detected object-contour obtained from the specification of the 50th frame. In this case, it is possible to reduce errors which may be produced or accumulated when the object-contour detection is repeated for a plurality of frames, and the object-contour detection can be carried out more accurately than in a case in which only one frame is specified.

When the image of the frame specified by the operator has been displayed on the color display 20, the operator specifies points near boundary locations of the object to be extracted from the image of the frame. This operation is called an object boundary specification. Each designation to specify the points near the object boundary locations within the image of the frame is effected by setting the cursor of the mouse 70 at the point and clicking it with the mouse 70. By repeating the setting and clicking of the mouse 70 for each of the points to be specified, the object boundary specification is performed by the operator.

Figure 5A:
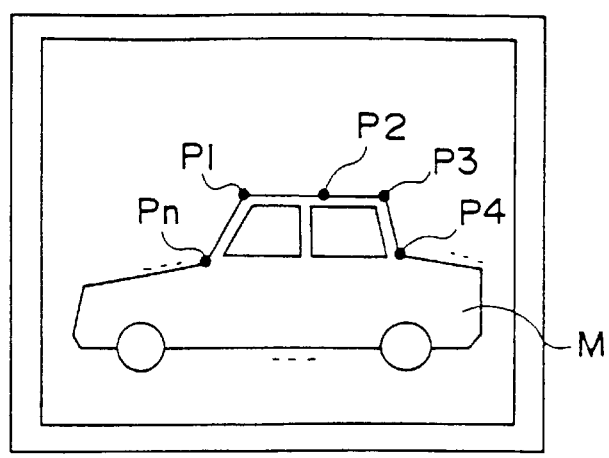
FIGS. 5A and 5B are diagrams for explaining a boundary point detection process.
Figure 5B:
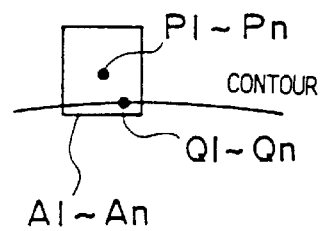

FIGS. 5A and 5B show a boundary point detection process which is performed by the CPU 102 at step S1-2 shown in FIG. 3. FIG. 5A shows the object boundary specification performed by the operator on the color display 20. FIG. 5B shows a relationship between a point designated by the operator, a detection range and a boundary point detected by the CPU 102. The frame provided in FIG. 5A and subjected to the boundary point detection process is called a first frame.

In FIG. 5A, "M" indicates a desired object to be extracted from the image of the frame specified, and "P1", "P2", . . . , "Pn" indicate points designated by the operator during the object boundary specification. In FIG. 5B, "P1–Pn" indicates a typical one of points designated by the operator, "A1–An" indicates a typical one of detection ranges, and "Q1–Qn" indicates a typical one of boundary points detected by the CPU 102.

When the points "P1", . . . , "Pn" near the boundary locations of the object "M" to be extracted have been specified by the operator and a command to start execution of the boundary point detection has been input by the operator, the CPU 102 performs the boundary point detection process S1-2 for each of the specified points "P1", . . . , "Pn" so that the boundary points "Q1", . . . , "Qn" on the contour of the object "M" are detected as the results of the boundary point detection.

Specifically, as shown in FIG. 5B, when the point "P1–Pn" has been designated and the command to start the execution has been input by the operator, the CPU 102 sets the detection range "A1–An" within the image of the frame, the detection range "A1–An" having a center placed at the point "P1–Pn", and detects a boundary point "Q1–Qn" within the detection range "A1–An" from the designated point "P1–Pn".

In the above embodiment, the detection range "A1–An" set by the CPU 102 is arranged in a square formation and is comprised of, for example, 5×5 picture elements (pixels). The detection range "A1–An" in this embodiment is called a square detection range.

Further, in the above embodiment, the boundary point detection process S1-2 performed by the CPU 102 is, for example, the boundary point detection process of the image processing method disclosed in U.S. Pat. No. 5,475,507 mentioned above. Herein, the disclosure of U.S. Pat. No. 5,475,507 mentioned above is hereby incorporated by reference. In the boundary point detection according to U.S. Pat. No. 5,475,507, a boundary point is detected by using a color mixing ratio at which an object color and a background color are mixed together by an additive process in a boundary region of the image. A picture element (pixel) of the image having a color mixing ratio that is nearest to 0.5 among the picture elements of the detection range is determined as a boundary pixel lying on the object-contour between the object and the background. This boundary point detection process is called a color-mixing-ratio method.

When the boundary points "Q1", . . . , "Qn" have been detected at the step S1-2, the CPU 102 automatically starts execution of a first object-contour detection process. During the first object-contour detection process, contour points "S1", . . . , "Sm" between two of the boundary points "Q1", . . . , "Qn" are detected by the CPU 102 so as to determine the contour of the object with respect to the first frame.

Figure 6:
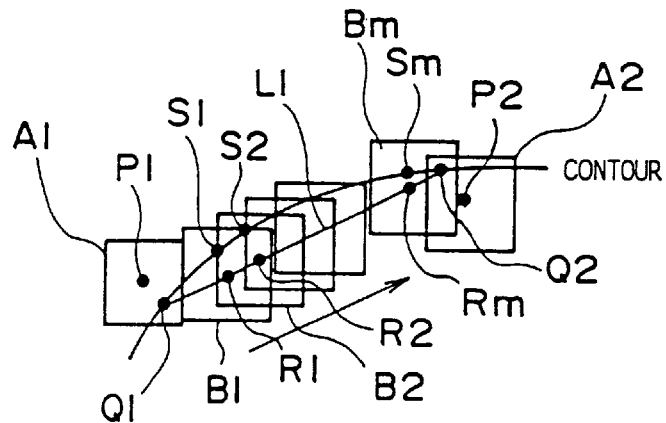
FIG. 6 is a diagram for explaining a first object-contour detection process.

FIG. 6 shows a first object-contour detection process which is performed by the CPU 102 at step S1-3 shown in FIG. 3.

In FIG. 6, "Q1" and "Q2" indicate two adjacent boundary points detected during the boundary point detection; "L1" indicates a straight line between the boundary points "Q1" and "Q2" which is set by the CPU 102; "R1", . . . , "Rm" indicate sampling points on the line "L1" which are set by the CPU 102; "B1", . . . , "Bm" indicate respective detection ranges for the sampling points "R1", . . . , "Rm"; and "S1", . . . , "Sm" indicate contour points detected by the CPU 102.

When the first object-contour detection process S1-3 is started, the CPU 102 sets each straight line between two adjacent ones of the boundary points "Q1"–"Qn". For example, as shown in FIG. 6, the straight line "L1" between the boundary points "Q1" and "Q2" is set. Next, the CPU 102 sets a predetermined number of sampling points "R1"–"Rm" on the line "L1" between the boundary points "Q1" and "Q2". Further, the CPU 102 sets respective detection ranges "B1"–"Bm" for the sampling points "R1"–"Rm", each detection range having a center placed at the corresponding sampling point, and detects contour points "S1"–"Sm" within the detection ranges "B1"–"Bm", respectively.

In the above embodiment, the first object-contour detection process S1-3 performed by the CPU 102 is, for example, the contour portion tracking process of the image processing method disclosed in U.S. Pat. No. 5,475,507.

When the contour points "S1", . . . , "Sm" between the boundary points "Q1" and "Q2" have been detected, the same process is repeated by the CPU 102 for all the boundary points "Q1", . . . , "Qn" so that the contour of the object with respect to the first frame is determined by the detected contour points "S1"–"Sm" and the boundary points "Q1"–"Qn".

When the object-contour with respect to the first frame has been determined, the CPU 102 automatically starts execution of a subsequent object-contour detection process. During the subsequent object-contour detection process, the CPU 102 detects contour points of second and subsequent frames of the input image data on the basis of the object-contour data of the first frame, so that the object-contour with respect to each of such subsequent frames is determined.

Figures 8A, 8B:
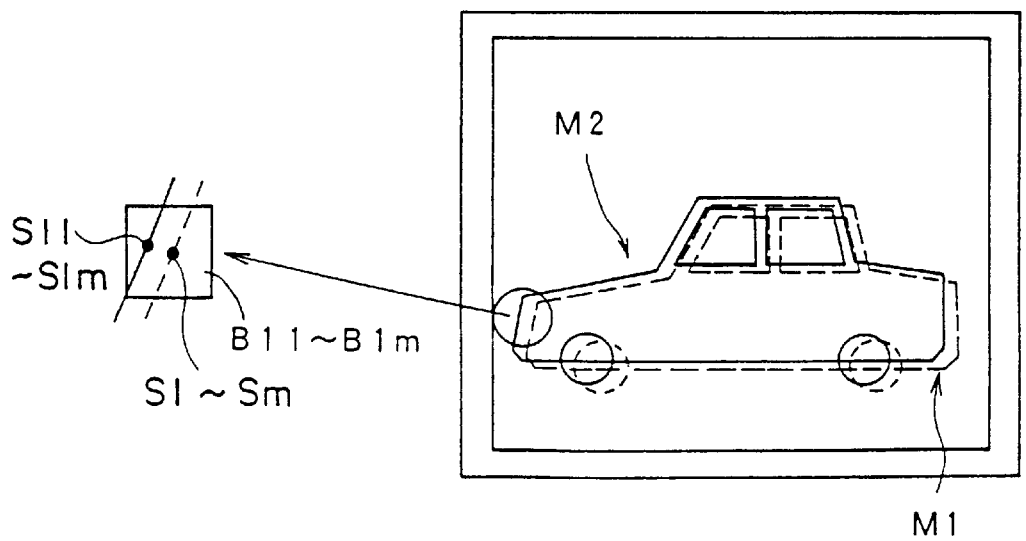
FIGS. 8A and 8B are diagrams for explaining a second object-contour detection process.

FIGS. 8A and 8B show a subsequent object-contour detection process which is performed by the CPU 102 at step S1-4 shown in FIG. 3. The subsequent object-contour detection process will be described later.

In the present embodiment, data of the contour points "S1"–"Sm" obtained during the first object-contour detection process S1-3 and data of the contour points obtained during the subsequent object-contour detection process S1-4 are called object-contour data. The CPU 102 stores and manages the object-contour data to carry out the object-contour detection and object extraction according to the present invention.

FIGS. 7A, 7B and 7C show methods for management of object-contour data obtained by the subsequent object-contour detection process S1-4. FIG. 7A shows a sequence of image frames f1 through fm, FIG. 7B shows a first object-contour data management method, and FIG. 7C shows a second data management method.

As shown in FIG. 7B, in the first object-contour data management method, a plurality of sets of a frame identification number and x and y coordinates of a location of a particular one of the contour points "S1" through "Sm" in a related frame of the image frames f1 through fm are defined as three-dimensional data. For example, with respect to a first one of the contour points of a first frame f1 (f1, x11, y11) is defined, and, with respect to a final one of the contour points of a final frame (fm, xmn, ymn) is defined. Such object-contour data is accessed by the CPU 102.

As shown in FIG. 7C, in the second object-contour data management method, a plurality of sets of elapsed time and x and y coordinates of a location of each of the contour points "S1" through "Sm" in the related frame are defined as three-dimensional data for the image frames f1 through fm. The elapsed time corresponds to the time at which the related frame is taken in the motion picture from the sequence of the frames, and is set at a multiple of 1/30 of a second for the related frame. For example, with respect to a first one of the contour points of a first elapsed time t1 (t1, x11, y11) is defined, and, with respect to a final one of the contour points of a final elapsed time tm (tm, xmn, ymn) is defined. In this case, such object-contour data is accessed by the CPU 102.

When the subsequent object-contour detection process S1-4 shown in FIG. 3 is started, the CPU 102 reads out the x and y coordinates of the location of each of the contour points "S1" through "Sm" in the first frame. The CPU 102 sets a detection range in the image of the second frame, the detection range having a center placed at one of the contour points "S1"–"Sm" with respect to the first frame, and detects a contour point within the detection range of the image of the second frame.

In FIG. 8A, the position of a contour of a first-frame object "M1" in the second frame is indicated by a dotted line, and the position of a contour of a corresponding second-frame object "M2" in the second frame is indicated by a solid line. FIG. 8B shows a relationship between a first-frame contour point "S1–Sm" read out by the CPU 102, a detection range "B11–B1m" and a second-frame contour point "S11–S1m" detected by the CPU 102. In FIG. 8B, "S1–Sm" indicates a typical one of the read-out first-frame contour points, "B11–B1m" indicates a typical one of detection ranges, and "S11–S1m" indicates a typical one of contour points detected by the CPU 102.

During the subsequent object-contour detection process S1-4, the CPU 102 performs the object-contour detection for each of the read-out contour points "S1"–"Sm" of the first frame so that the contour points "S11"–"S1m" on the contour of the second-frame object "M2" are detected as the results of the object-contour detection.

For example, the CPU 102 sets a detection range "B11" within the image of the second frame, the detection range "B11" having a center placed at the first-frame contour point "S1" whose coordinates are read out, and detects a contour point "S11" within the detection range "B11" in the same detection method as the first object-contour detection process S1-3 described above.

As shown in FIG. 8A, the contour of the first-frame object M1 and the contour of the second-frame object M2 are adjacent to each other in the image of the second frame. As the object in the images of two sequential frames is considered, the contour points of the object of the preceding frame are always located near the contour of the same object of the following frame. Therefore, it is possible to detect the following-frame contour point within the detection range with accuracy and reliability by setting the detection range within the following frame at one of the preceding-frame contour points.

When the subsequent object-contour detection process S1-4 is completed, the CPU 102 at step S1-5 detects whether all the frames of the input image data are processed. When the result at the step S1-5 is negative, the subsequent object-contour detection process S1-4 is repeated by the CPU 102 for the third and subsequent frames. When the result at the step S1-5 is affirmative and a command to start execution of object extraction has been input by the operator, the CPU 102 performs an object extraction process S1-6 shown in FIG. 3.

Therefore, the CPU 102 automatically detects the contour of each of the second and subsequent frames on the basis of the object-contour data of the preceding frame without obtaining the frame and object boundary specification from the operator.

Figure 9A:
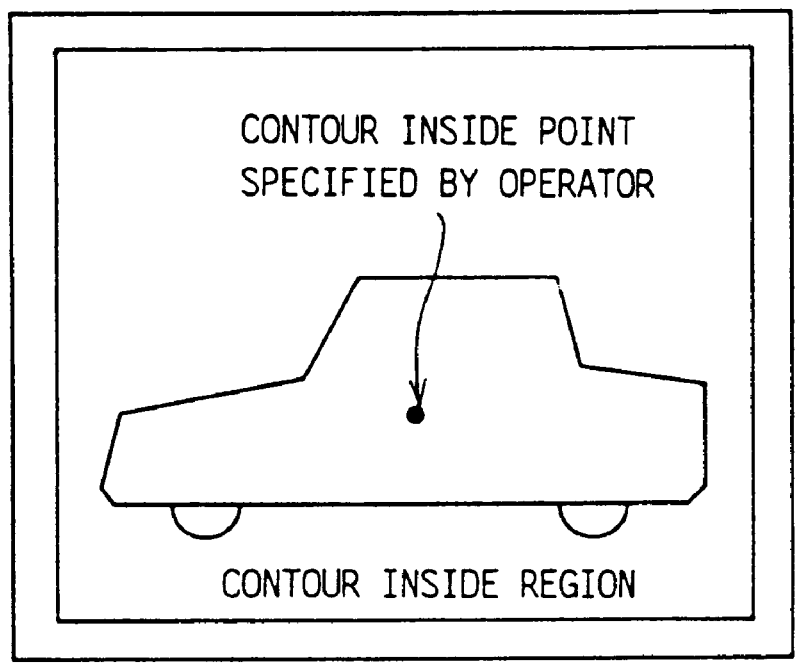
FIGS. 9A and 9B are diagrams for explaining an object extraction process.
Figure 9B:
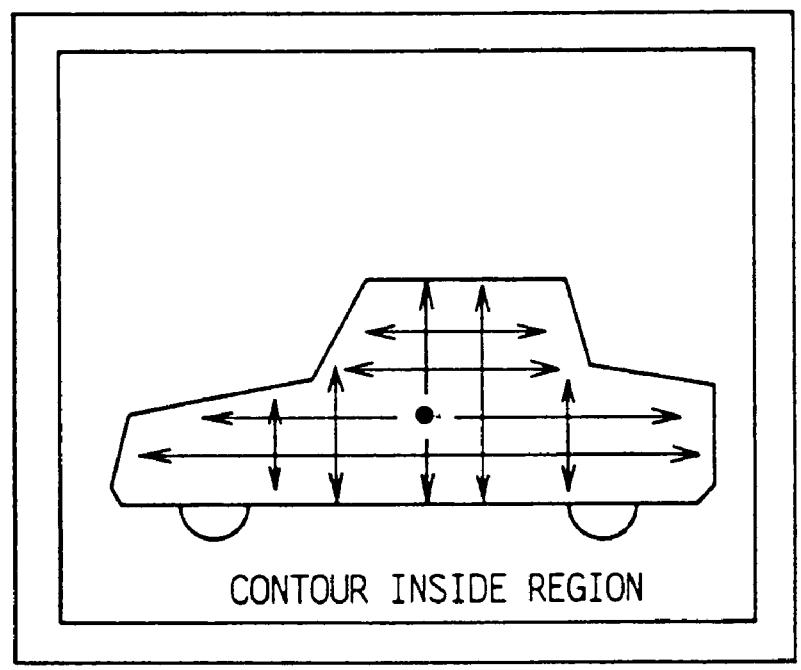

FIGS. 9A and 9B show an object extraction process performed by the CPU 102 at the step S1-6 shown in FIG. 3.

When the object-contour of each of the frames of the input image data has been detected, the CPU 102 sends the object-contour data to the display memory 14, and the object-contour is displayed on the color display 20. When the command to start the execution of object extraction has been input by the operator, the CPU 102 performs the object extraction process S1-6. During the object extracting process, the operator uses the function of the object inside specification unit 13a to specify the inside of the object-contour displayed on the color display 20. When the operator's specification has been given, the CPU 102 performs an object extracting operation by uniformly filling either the inside or the outside of the contour with prescribed image data, so that data of coordinates within the contour are obtained as the results of the object extraction. The results of the object extraction on the basis of the detection of the object-contour are sent to the display memory 14, and are displayed on the color display 30.

As shown in FIG. 9A, when the object inside specification is specified, the operator specifies an arbitrary point inside the object-contour displayed on the color display 20, and selects one of predetermined image data filling options: inside image filling; outside image filling; and inside color filling.

For example, when the inside image filling method is selected by the operator, the CPU 102 masks the image data of the outside of the contour and fills the inside of the contour with the prescribed image data as shown in FIG. 9B. When the outside image filling method is selected by the operator, the CPU 102 masks the image data of the inside of the contour and fills the outside of the contour with the prescribed image data. Further, when the inside color filling method is selected by the operator, the CPU 102 fills the inside of the contour with a prescribed color.

In the above-described embodiment, only the frame and object boundary specification for the first frame is given by the operator, and the contour detection for all the frames is automatically carried out by the CPU 102. Further, in the above-described embodiment, it is possible to detect the contour of a desired object from the motion picture and extract the object from the motion picture with accuracy and reliability.

Figure 10:
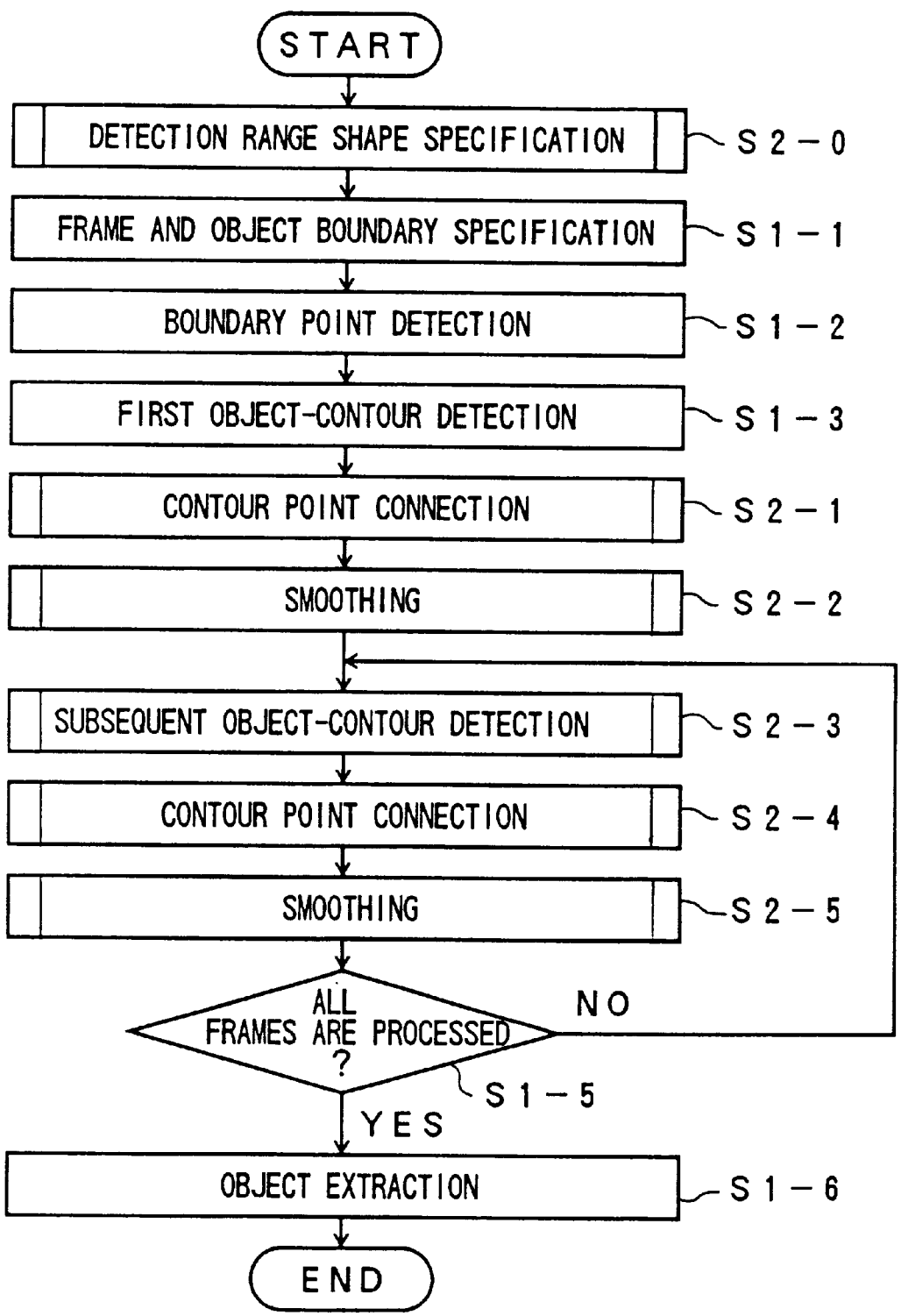
FIG. 10 is a flowchart for explaining basic processes of a second embodiment of object-contour detection and object extraction according to the present invention.

Next, FIG. 10 shows basic processes of a second embodiment of object-contour detection and object extraction according to the present invention. The processes shown in FIG. 10 are performed under program-control by the CPU 102. The arrangement of the image processing system in this embodiment is the same as that of the image processing system of FIG. 2, and a description thereof will be omitted.

In FIG. 10, the processes which are the same as corresponding processes in FIG. 3 are designated by the same reference numerals, and a description thereof will be omitted.

In the present embodiment, a detection range shape specification process S2-0, contour point connection processes S2-1 and S2-4, and smoothing processes S2-2 and S2-5 are provided in addition to the processes of FIG. 3. Further, a subsequent object-contour detection process S2-3 which is different from the subsequent object-contour detection process S1-4 of FIG. 3 is provided.

As shown in FIG. 10, when the object-contour detection and object extraction has been started, the CPU 102 at step S2-0 performs the detection range shape specification process. During this process S2-0, one of predetermined detection range shape options is specified by the operator, and the CPU 102 receives data of the specified detection range shape.

In the above embodiment, the predetermined detection range shape options are, for example, a square detection range and an elliptic detection range. When the square detection range option has been specified by the operator, the CPU 102 receives the data of the specification and sets the square detection range which is arranged in the square formation as shown in FIG. 6. When the elliptic detection range option has been specified by the operator, the CPU 102 receives the data of the specification and sets an elliptic detection range which is arranged in the shape of an ellipse, the ellipse having a major axis extending along the contour of the object of the first frame.

In the step S2-0, the elliptic detection range option is specified by the operator and the CPU 102 sets the elliptic detection range in the image of the first frame.

When the first object-contour detection process S1-3 has been completed, the CPU 102 performs the contour point connection process S2-1. As described above, by the first object-contour detection process S1-3, the contour points of the object of the first frame and the object-contour thereof are determined. However, the object-contour determined at the process S1-3 may be a noncontinuous line since the detected contour points are not necessarily connected to each other with continuity. To eliminate such a noncontinuity, the contour point connection process S2-1 is performed by the CPU 102.

Figure 11:
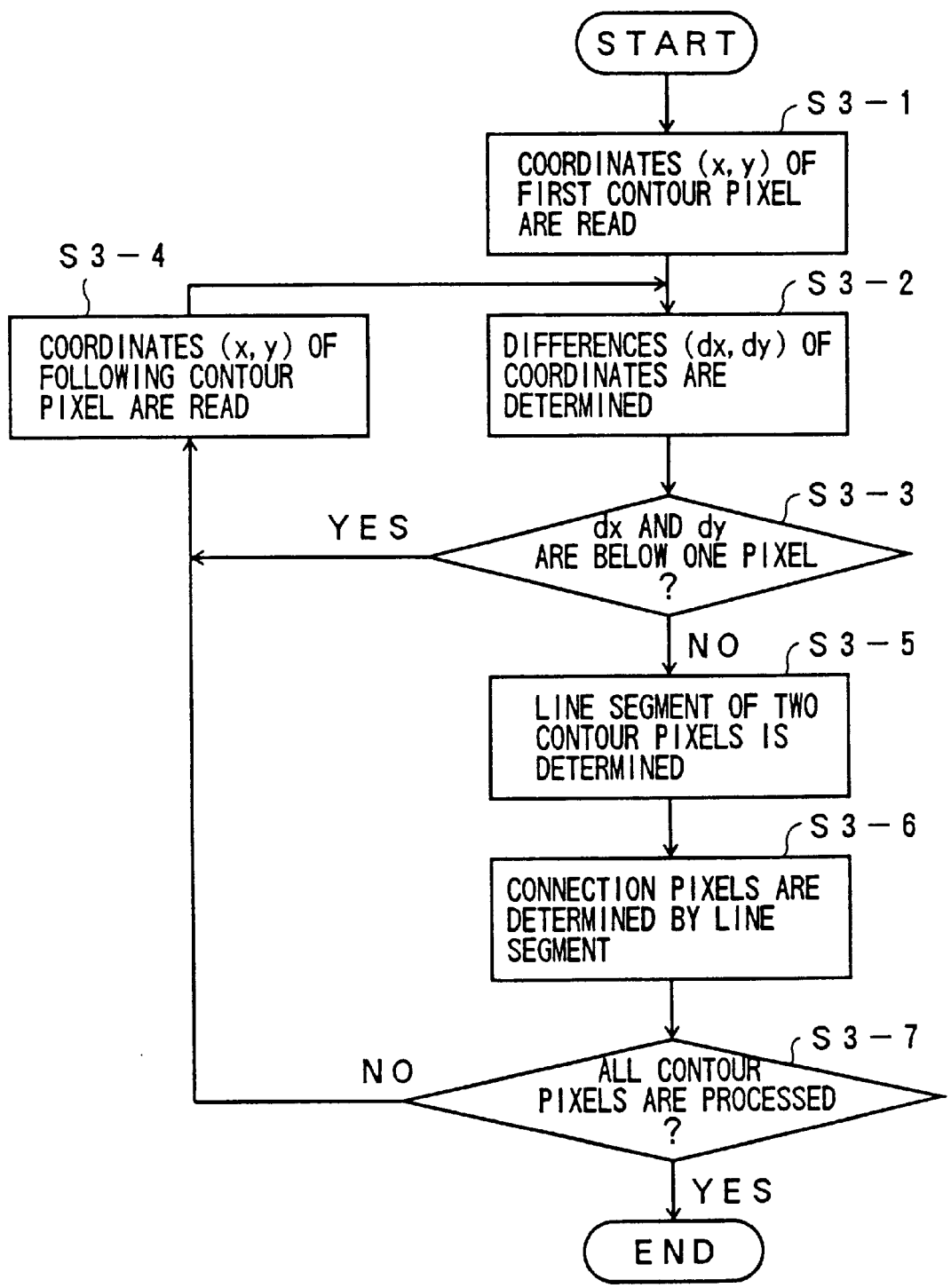
FIG. 11 is a flowchart for explaining basic steps of a contour point connection process.
Figure 12A:
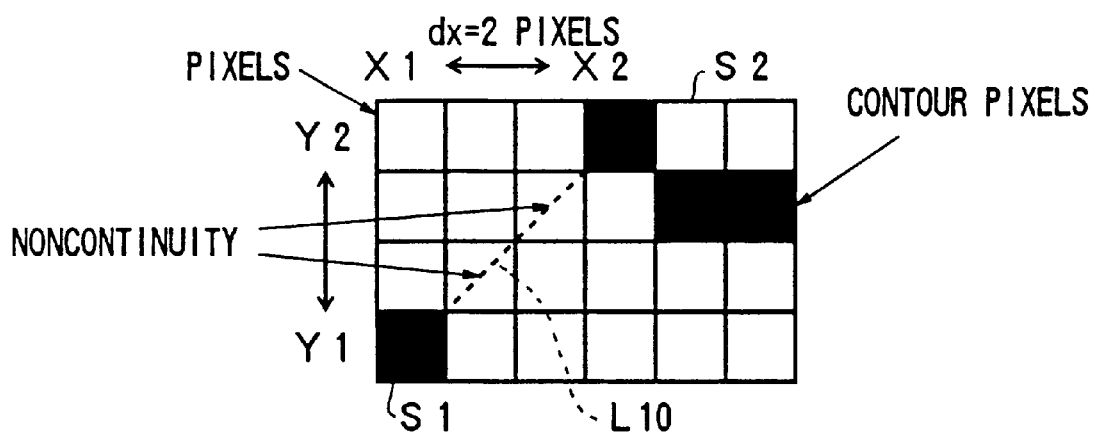
FIGS. 12A and 12B are diagrams for explaining the contour point connection process.
Figure 12B:
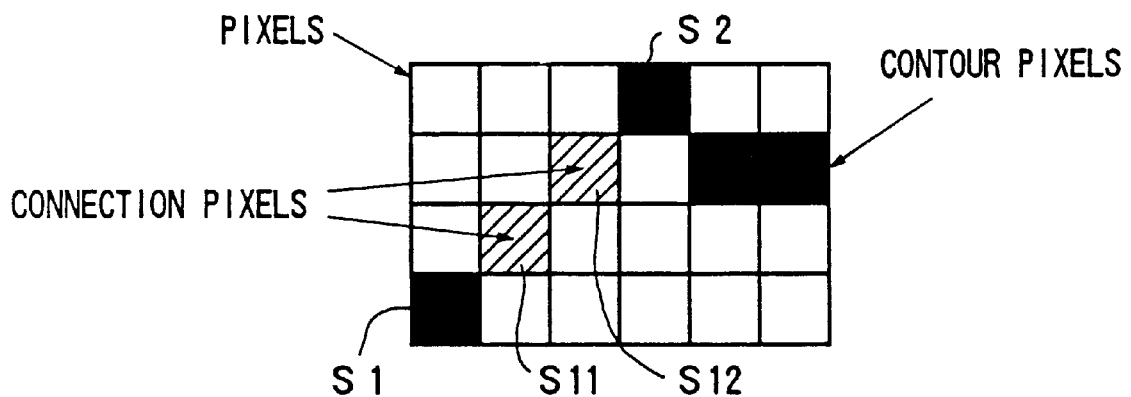

FIG. 11 shows basic steps of the contour point connection process S2-1. FIGS. 12A and 12B are diagrams for explaining the contour point connection process S2-1.

As shown in FIG. 11, when the contour point connection process is started, the CPU 102 at step S3-1 reads out x and y coordinates (x1, y1) of a first one "S1" of the contour pixels which have been obtained at the step S1-3. At the step S3-1, x and y coordinates (x2, y2) of a second one "S2" of the contour pixels are also read out.

At step S3-2, the CPU 102 determines differences (dx, dy) between the coordinates of the first contour pixel "S1" and the coordinates of the second contour pixel "S2". In the example of FIG. 2A, the differences dx and dy are both two pixels.

At step S3-3, the CPU 102 detects whether the differences (dx, dy) are smaller than or equal to one pixel (or ±1 pixel).

When the result at the step S3-3 is affirmative, it is determined that the two contour pixels are connected to each other with continuity. At step S3-4, the CPU 102 reads out x and y coordinates (x, y) of a following one of the contour pixels. After the step S3-4 is performed, the CPU 102 repeats the step S3-2.

When the result at the step S3-3 is negative, it is determined that the two contour pixels are not connected to each other with continuity. That is, in this case, a noncontinuity in the contour pixels obtained by the first object-contour detection is detected. At step S3-5, the CPU 102 determines a line segment ("L10", in FIG. 12A) which interconnects the two contour pixels ("S1" and "S2" in FIG. 12A).

After the step S3-5 is performed, the CPU 102 at step S3-6 determines connection pixels ("S11" and "S12" in FIG. 12B) which are passed through by the line segment "L10", and sets the connection pixels to be new contour pixels as the results of the contour point connection.

After the step S3-6 is performed, the CPU 102 at step S3-7 detects whether all the contour pixels are processed. When the result at the step S37 is affirmative, the contour point connection process of FIG. 11 ends. When the result at the step S3-7 is negative, the above step S3-4 is repeated by the CPU 102.

In the present embodiment of the contour point connection process, it is possible to automatically eliminate a noncontinuity in the contour points obtained by the first object-contour detection, and it is possible to detect the contour points of a desired object in a motion picture with accuracy and reliability.

As shown in FIG. 10, when the contour point connection process S2-1 has been completed, the CPU 102 performs the smoothing process S2-2. When the boundary point detection process S1-2 is performed by using the color mixing ratio method, there may be a case in which two or more pixels having the same color mixing ratio are detected within the detection range. In this case, the boundary points detected show an irregular boundary portion of the contour. To eliminate such a portion from the contour, the smoothing process S2-2 is performed by the CPU 102.

Figure 13:
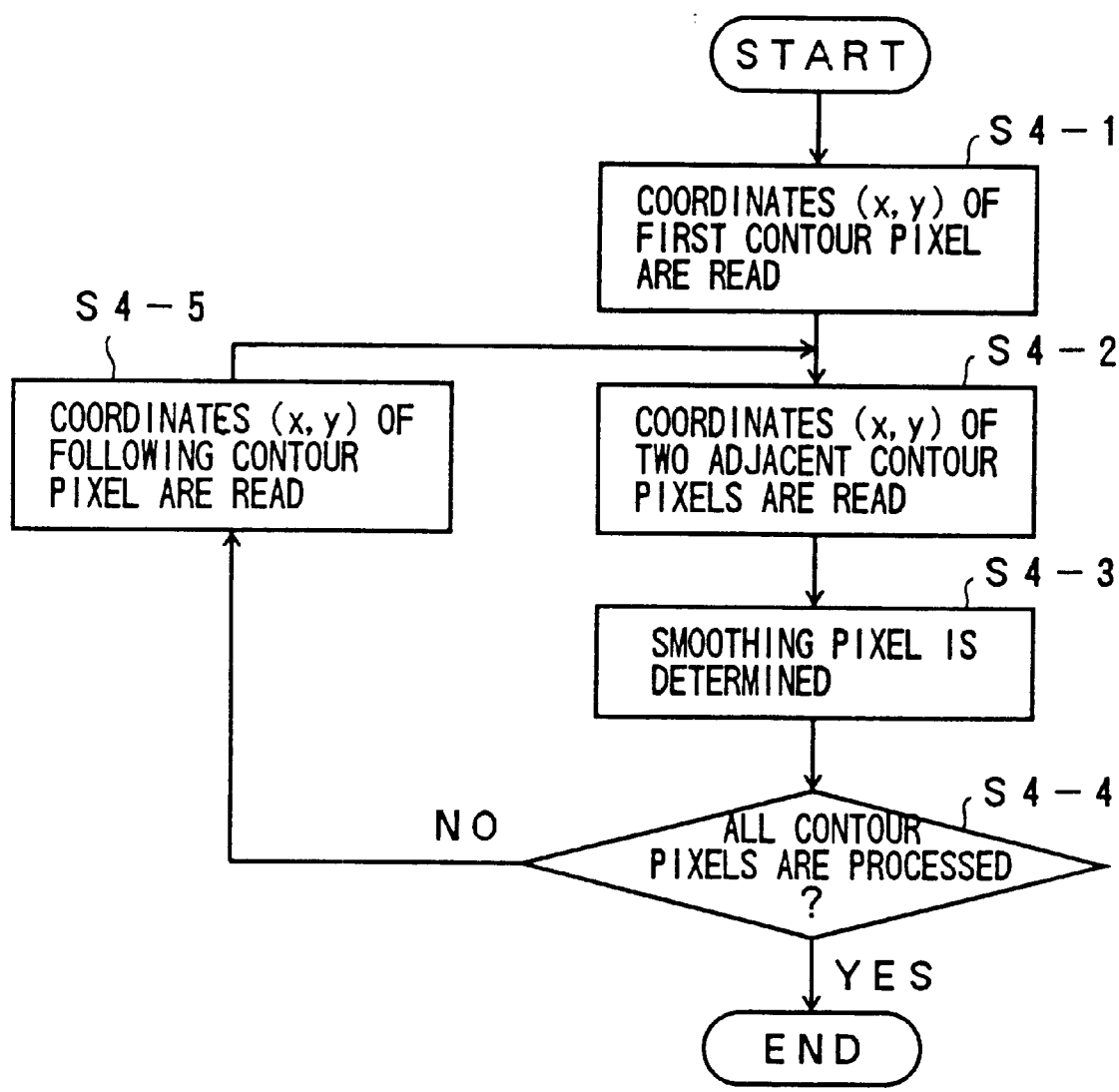
FIG. 13 is a flowchart for explaining basic steps of a smoothing process.
Figure 14A:
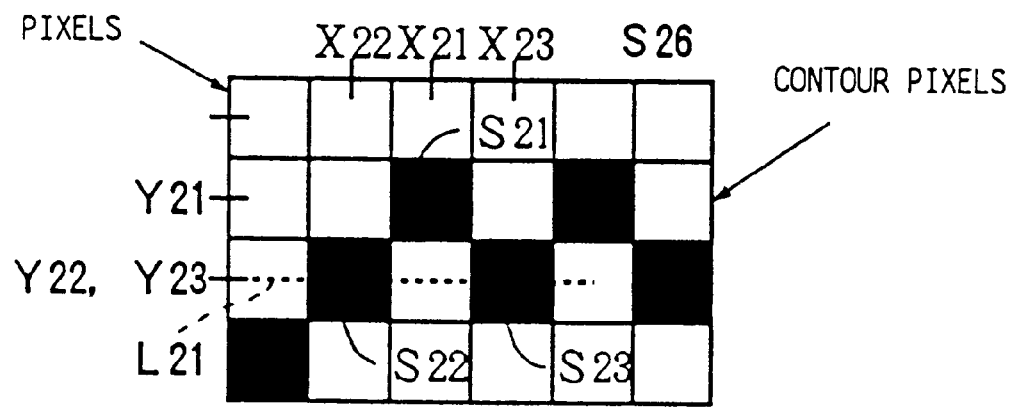
FIGS. 14A and 14B are diagrams for explaining the smoothing process.
Figure 14B:
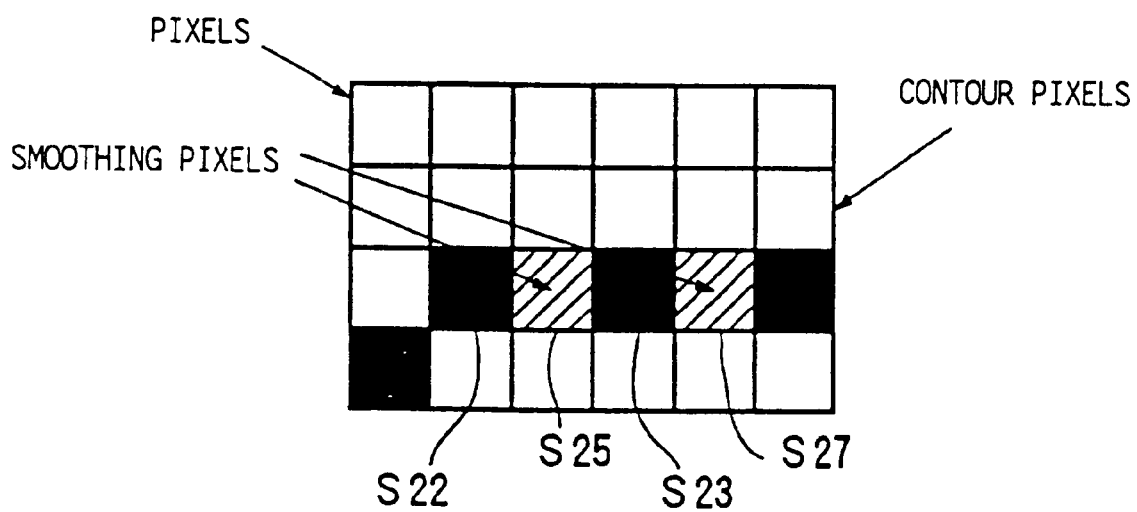

FIG. 13 shows basic steps of the smoothing process S2-2. FIGS. 14A and 14B are diagrams for explaining the smoothing process S2-2.

As shown in FIG. 13, when the smoothing process S2-2 is started, the CPU 102 at step S4-1 reads out x and y coordinates (x21, y21) of a first one "S21" of the contour pixels which have been obtained at the step S2-1.

At step S4-2, the CPU 102 reads out x and y coordinates (x22, y22) and (x23, y23) of two contour pixels "S22" and "S23" which are adjacent to the first contour pixel "S21" as shown in FIG. 14A.

At step S4-3, the CPU 102 determines a straight line "L21" which interconnects the two adjacent contour pixels. The CPU 102 performs a linear approximation of the first contour pixel "S21" to the straight line "L21", and sets the first contour pixel "S21", when the straight line does not pass through the first contour pixel, to be a smoothing pixel "S25" that lies on the straight line, as shown in FIG. 14B.

After the step S4-3 is performed, the CPU 102 at step S4-4 detects whether all the contour pixels are processed. When the result at the step S4-4 is affirmative, the smoothing process of FIG. 13 ends. When the result at the step S4-4 is negative, the CPU 102 at step S4-5 reads out x and y coordinates (x, y) of a following one of the contour pixels. After the step S4-5 is performed, the CPU 102 repeats the step S4-2.

In the present embodiment of the smoothing process, it is possible to automatically eliminate an irregular boundary portion of the contour obtained by the boundary point detection, and it is possible to obtain a smooth contour of a desired object in a motion picture with accuracy and reliability.

As shown in FIG. 10, when the smoothing process S2-2 has been completed, the CPU 102 performs the subsequent object-contour detection process S2-3.

Figure 15:
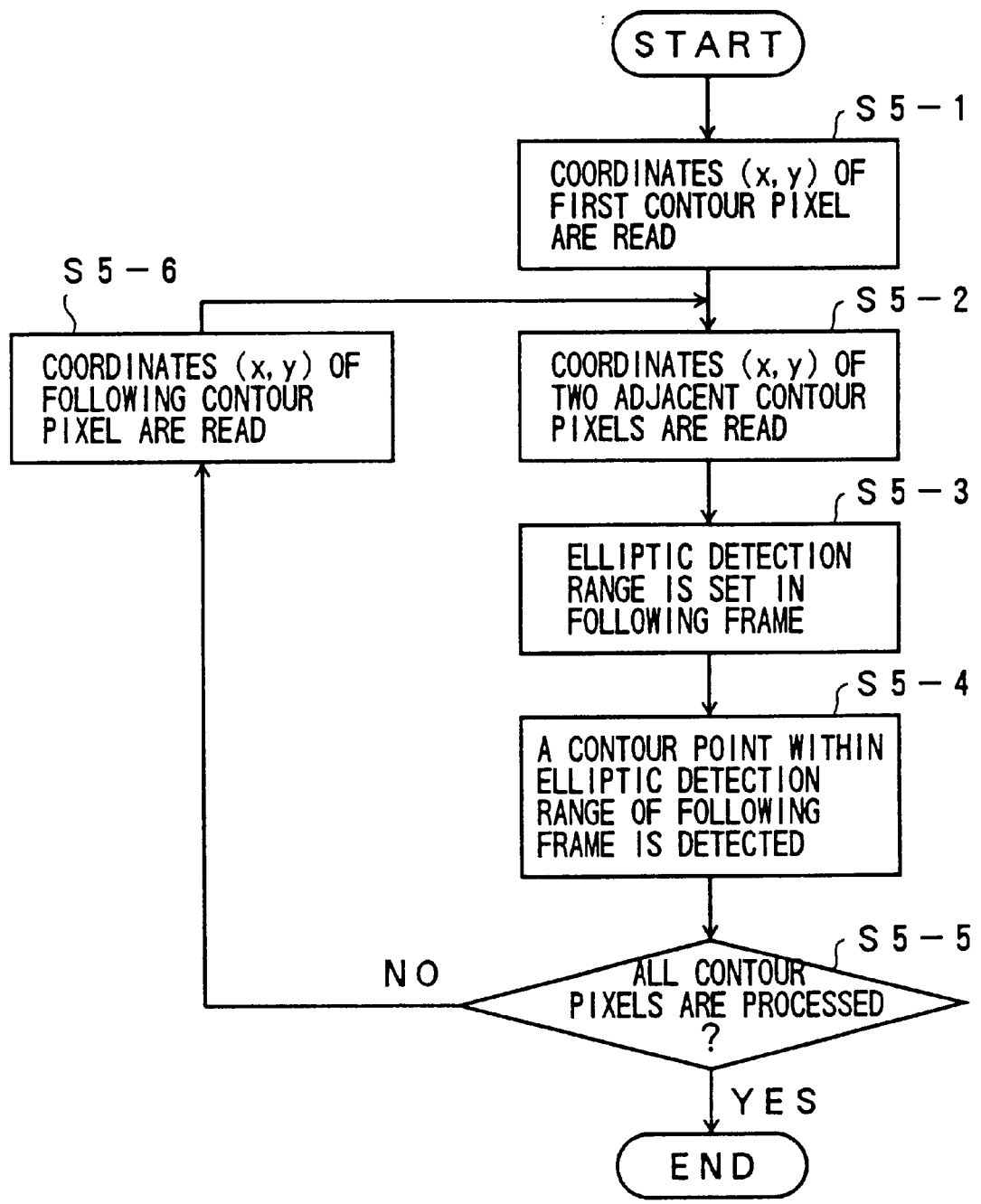
FIG. 15 is a flowchart for explaining basic steps of an object-contour detection process.
Figure 16A:
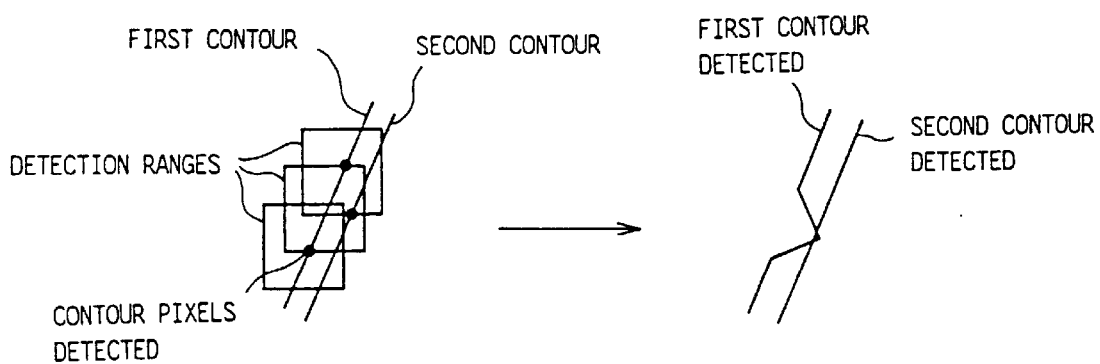
FIGS. 16A and 16B are diagrams for explaining the object-contour detection process.
Figure 16B:
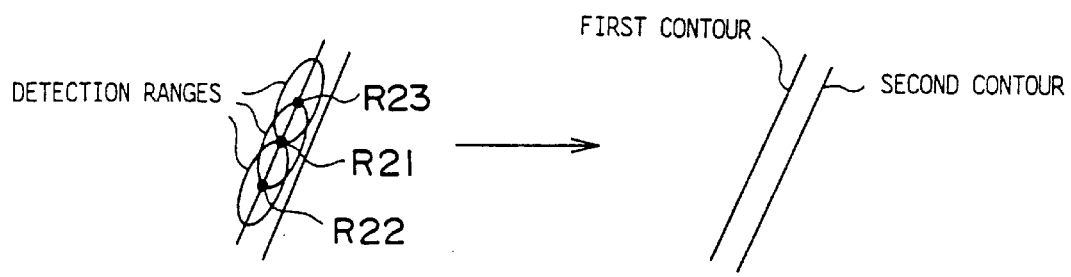

FIG. 15 shows basic steps of the subsequent object-contour detection process S2-3. FIGS. 16A and 16B are diagrams for explaining the object-contour detection process S2-3. FIG. 16A shows an operation of the subsequent object-contour detection when the square detection range is set, and FIG. 16B shows an operation of the subsequent object-contour detection when the elliptic detection range is set.

When the square detection range is set, as shown in FIG. 16A, a square detection range of a first contour to be detected may be set such that the square detection range of the first contour includes a portion of a second contour if the first contour and the second contour are located within a very small distance. In this case, a point on the second contour may be erroneously detected as being a point on the first contour by the subsequent object-contour detection.

To avoid this, in the present embodiment, the CPU 102 sets the elliptic detection range in one of the images of the subsequent frames, the ellipse having a major axis which interconnects two of the contour points detected by the first object-contour detection. As shown in FIG. 16B, each of the detection ranges is arranged in the shape of an ellipse, the ellipse having a major axis extending along a first contour to be detected. Each of the elliptic detection ranges of the first contour does not include a portion of a second contour. Therefore, a point on the first contour and a point on the second contour can be accurately detected by the subsequent object-contour detection independently of each other.

As shown in FIG. 15, when the subsequent object-contour detection process S2-3 is started, the CPU 102 at step S5-1 reads out x and y coordinates of a first one ("R21" in FIG. 16B) of the contour pixels of a preceding-frame object, the contour pixels having been obtained at the step S2-2.

At step S5-2, the CPU 102 reads out x and y coordinates of two contour pixels ("R22" and "R23" in FIG. 16B) of the contour pixels of the preceding-frame object, the two contour pixels being adjacent to the first contour pixel "R21" as shown in FIG. 16B.

At step S5-3, the CPU 102 sets an elliptic detection range in the image of a following frame. In the elliptic detection range, a major axis of the ellipse extends along a straight line which interconnects the two adjacent contour pixels "R22" and "R23". Specifically, the major axis of the ellipse interconnects the two adjacent contour pixels "R22" and "R23", the elliptic detection range has a center placed at the point of the first contour pixel "R21", and the ellipse has a given ratio of the larger diameter to the smaller diameter.

At step S5-4, the CPU 102 detects a contour point within the elliptic detection range of the image of the following frame by using the color mixing ratio method described above.

After the step S5-4 is performed, the CPU 102 at step S5-5 detects whether all the contour points of the preceding frame are processed.

When the result at the step S5-5 is affirmative, the subsequent object-contour detection process of FIG. 15 ends. When the result at the step S5-5 is negative, the CPU 102 at step S5-6 reads out coordinates (x, y) of a following one of the contour pixels of the preceding frame. After the step S5-6 is performed, the CPU 102 repeats the step S5-2.

As shown in FIG. 10, when the subsequent object-contour detection process S2-3 has been completed, the CPU 102 performs the contour point connection process S2-4 and the smoothing process S2-5 with respect to one of the subsequent frames, which are essentially the same as the contour point connection process S2-1 and the smoothing process S2-2, respectively.

In the present embodiment of the subsequent object-contour detection process, it is possible to detect the following-frame contour point within the elliptic detection range with increased accuracy and reliability by setting the elliptic detection range within the following frame at one of the preceding-frame contour points. It is possible to avoid the erroneous detection which may occur in the case of the square detection range.

It is estimated that a contour of a preceding-frame object extends in the same direction as a contour of a following-frame object. Therefore, the above subsequent object-contour detection can detect the following-frame contour point within the elliptic detection range with accuracy and reliability.

Figure 17:
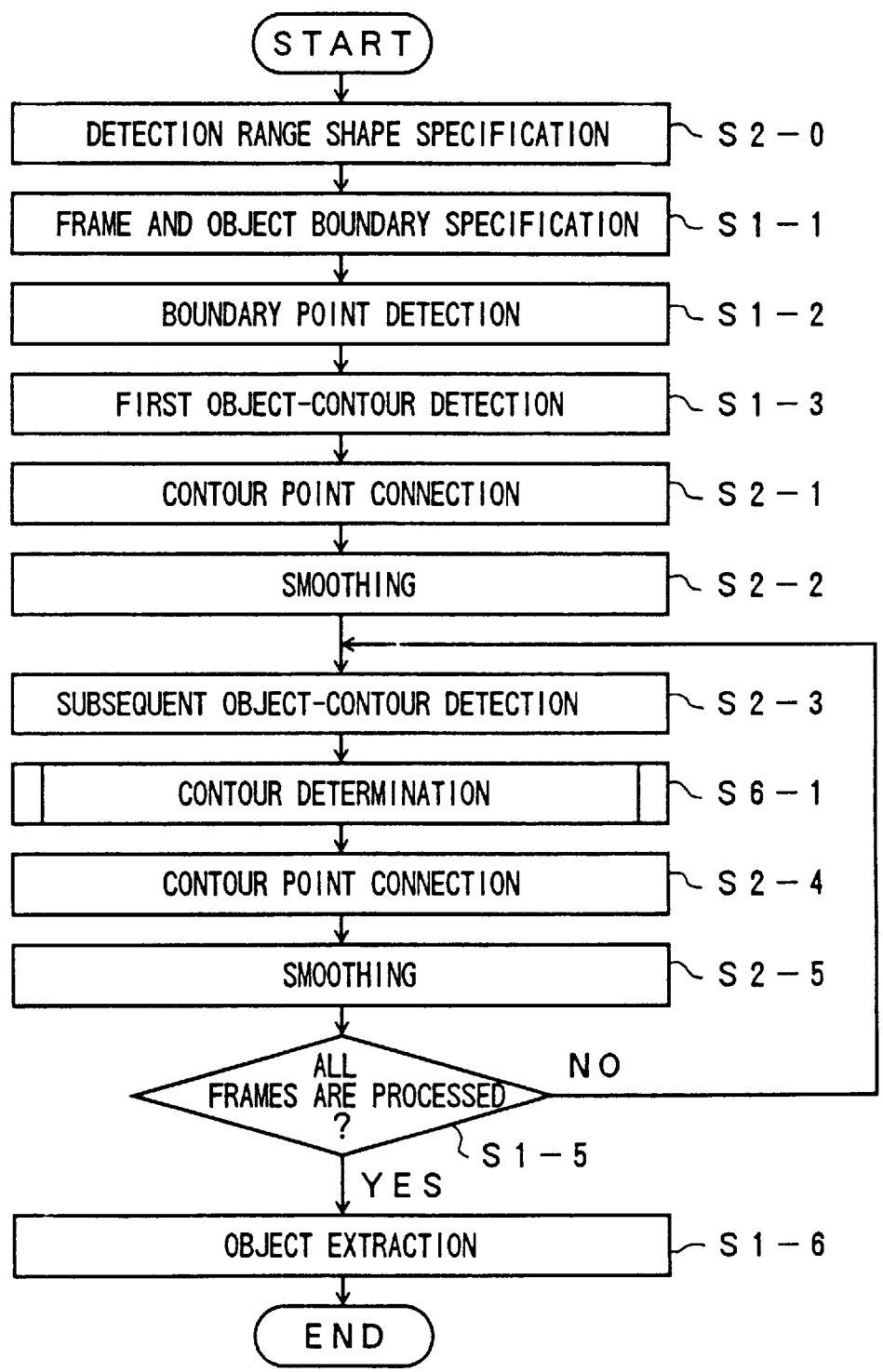
FIG. 17 is a flowchart for explaining a third embodiment of object-contour detection and object extraction processing according to the present invention.

Next, FIG. 17 shows a third embodiment of object-contour detection and object extraction processing according to the present invention.

The processes shown in FIG. 17 are performed under program-control by the CPU 102. The arrangement of the image processing system in this embodiment is the same as that of the image processing system of FIG. 2, and a description thereof will be omitted.

In FIG. 17, the processes which are the same as corresponding processes in FIG. 10 are designated by the same reference numerals, and a description thereof will be omitted.

In the present embodiment, a contour determination process S6-1 is provided after the end of the subsequent object-contour detection process S2-3 as shown in FIG. 17. During the contour determination process S6-1, it is determined whether the object-contour being detected through the process S2-3 is accepted as the results of object-contour detection.

Figure 18:
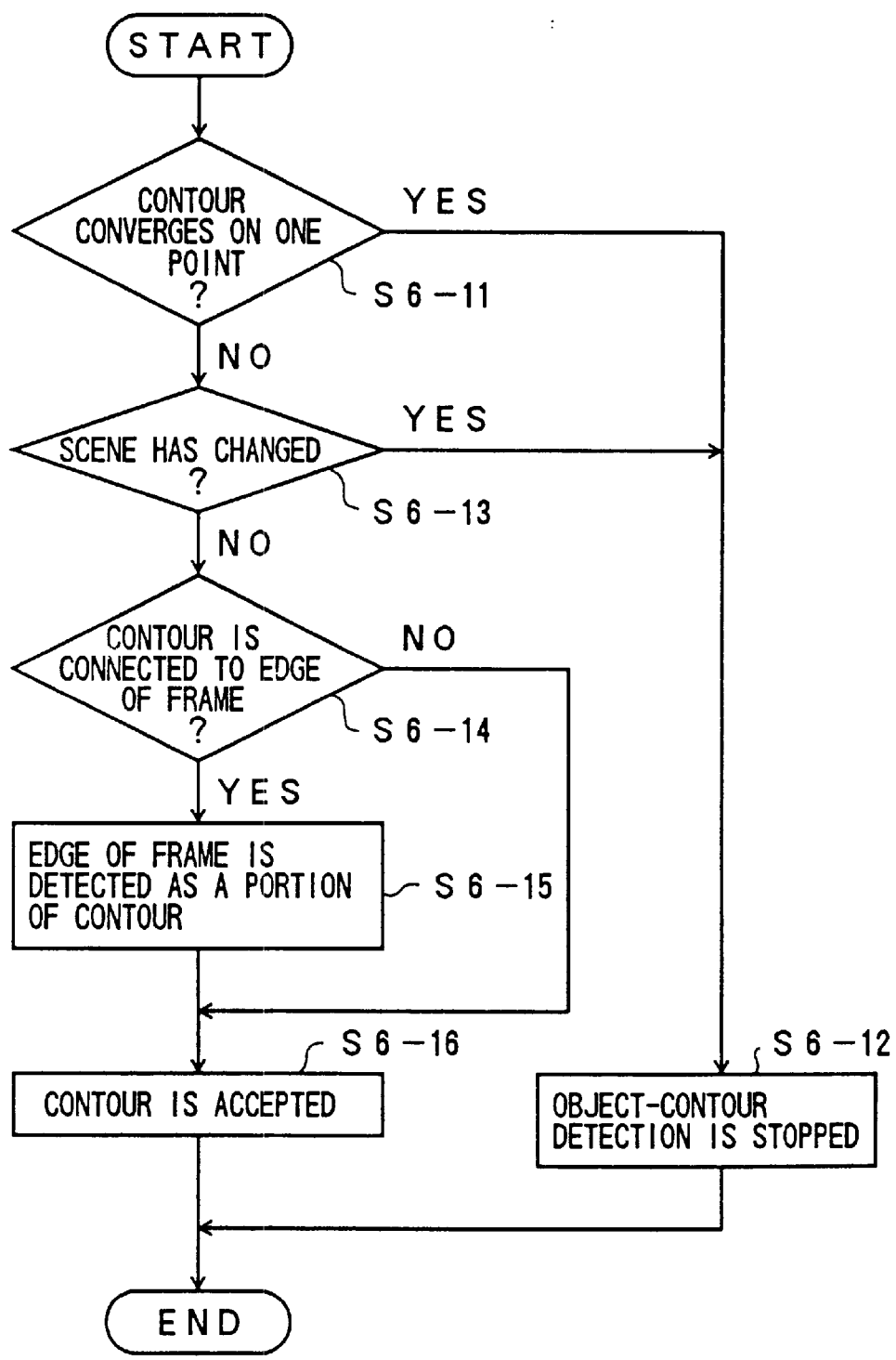
FIG. 18 is a flowchart for explaining basic steps of a contour determination process.

FIG. 18 shows basic steps of the contour determination process S6-1.

As shown in FIG. 18, when the contour determination process S6-1 is started, the CPU 102 at step S6-11 detects whether the contour obtained by the subsequent object-contour detection S2-3 converges on one point. In the present embodiment, when the number of pixels contained in the contour is smaller than a given number, it is determined that the contour converges on one point and object-contour detection is not possible.

When the result at the step S6-11 is affirmative, it is determined that the object-contour is going to disappear in the motion picture. At step S6-12, the CPU 102 stops the execution of the object-contour detection with respect to the following frame. It is possible to prevent unnecessary computer operations from being performed.

The given number which is used for the determination as to the convergence of the contour may be preset to an appropriate value by the operator.

When the result at the step S6-11 is negative, it is determined that the convergence of the contour is not detected. At step S6-13, the CPU 102 detects whether the scene has changed to a different one by comparing the contour of the preceding-frame object with the contour of the following-frame object. In the present embodiment, when a difference between image data of a contour of a preceding frame and image data of a contour of a following frame is detected to be greater than a predetermined value, it is determined that the scene has changed to a different scene.

When the result at the step S6-13 is affirmative, it is determined that the scene has changed. At the step S6-12, the CPU 102 stops the execution of the object-contour detection with respect to the following frame. It is possible to prevent unnecessary computer operations from being performed.

When the result at the step S6-13 is negative, it is determined that the scene has not changed. At step S6-14, the CPU 102 detects whether the contour is connected to an edge of the frame. In the present embodiment, the size of the frame is predetermined so that the coordinates of edges of the frame are indicated by given minimum coordinates (0, 0) and/or given maximum coordinates (Xo, Yo). When the coordinates of a point of the contour are below the minimum coordinates or above the maximum coordinates, it is determined that the contour is connected to an edge of the frame.

When the result at the step S6-14 is affirmative, it is determined that the contour is connected to the edge of the frame. At step S6-15, the CPU 102 detects the frame edge to be a portion of the contour. At step S6-16, the CPU 102 makes a determination that the contour is accepted as the results of object-contour detection.

When the result at the step S6-14 is negative, it is determined that the contour is not connected to the edge of the frame. In this case, the step S6-15 is not performed, and only the step S6-16 is performed by the CPU 102. At the step S6-16, it is determined that the contour is accepted as the results of object-contour detection.

After the step S6-12 is performed, the control of the CPU 102 may be transferred to the step S1-1 of FIG. 17. After the convergence of the contour or the change of the scene has occurred, it is desirable that the object-contour detection and object extraction processing is started again by performing the frame and object boundary specification with respect to the following frame.

In the present embodiment of the object-contour detection and object extraction processing, it is possible to carry out appropriate processes in cases such as the convergence of the contour, the change of the scene, and the connection of the contour to the frame edge.

Figure 19A:
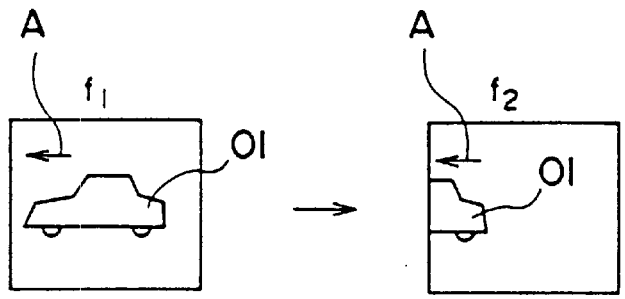
FIGS. 19A, 19B and 19C are diagrams for explaining the contour determination process.
Figure 19B:
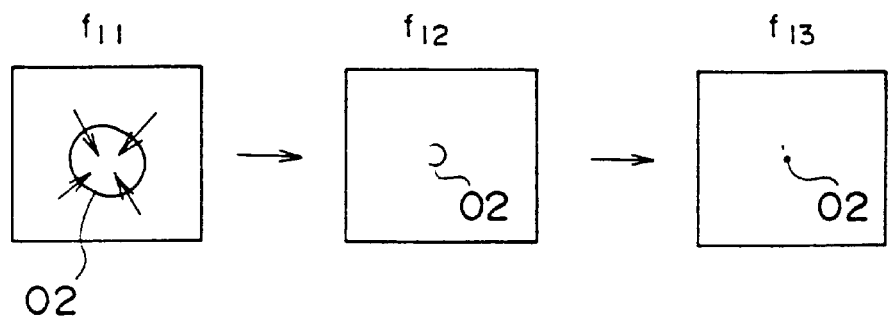
Figure 19C:
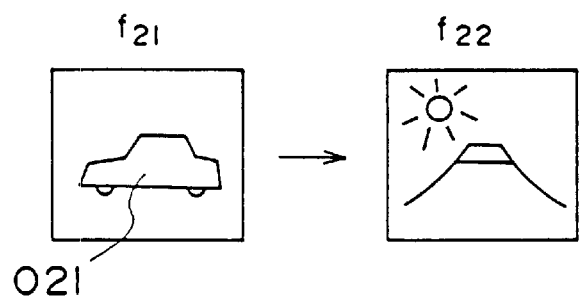

FIGS. 19A, 19B and 19C are diagrams for explaining the contour determination process S6-1.

In an example of FIG. 19A, an object "O1" (an automobile) of a frame "f1" taken at a previous time moves in a direction indicated by the arrow "A", and is going to disappear from the motion picture as in a frame "f2" taken at a following time. In this example, the step S6-15 is performed and the frame edge is detected to be a portion of the contour of the object "O1".

Figure 20:
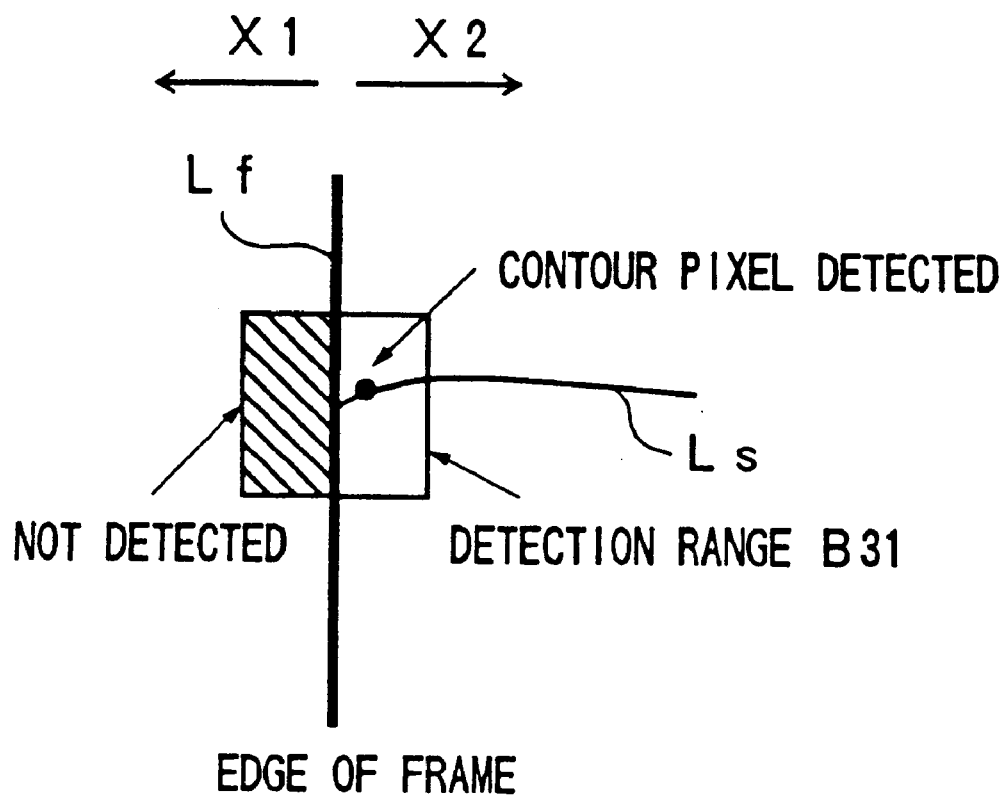
FIG. 20 is a diagram for explaining a frame-edge detection process.

FIG. 20 is a diagram for explaining the frame-edge detection process in the contour determination process of FIG. 18. In FIG. 20, "Lf" indicates an edge of a frame being processed, "Ls" indicates a contour of an object of the frame, "B31" indicates a detection range used to detect a contour pixel, "X1" indicates a direction toward the outside of the frame, and "X2" indicates a direction toward the inside of the frame.

As shown in FIG. 20, when the detection range B31 is connected to the edge Lf of the frame, picture elements of the detection range B31 which are the outside of the frame edge Lf are not subjected to the object-contour detection. Therefore, the frame edge Lf is detected as a portion of the object-contour being detected.

In an example of FIG. 19B, an object "O2" (a balloon) of a frame "f11" taken at a previous time is deflated and converges on one point in the motion picture as in frames "f12" and "f13" taken at following times. In this example, the step S6-12 is performed and the object-contour detection with respect to a subsequent frame is stopped. It is possible to prevent unnecessary computer operations from being performed.

In an example of FIG. 19C, an object "O21" (an automobile) of a frame "f21" taken at a previous time has changed to a different scene in a motion picture as in a frame "f22" taken at a following time. In this example, the step S6-12 is performed and the object-contour detection with respect to a subsequent frame is stopped. It is possible to prevent unnecessary computer operations from being performed.

In the present embodiment of the object-contour detection and object extraction processing, when detecting the contour of a desired object from image frames of a motion picture, unnecessary redundant operations by the operator are not needed. Only the frame and object boundary specification for the first frame is given by the operator, and the contour detection for all the frames is automatically carried out by the computer operations.

Further, the present invention is not limited to the above-described embodiments, and variations and modifications may be made without departing from the scope of the present invention.

What is claimed is:

1. An image processing apparatus detecting a contour of an object from a sequence of images wherein the images include a first image containing the object and subsequent images containing the object, said apparatus comprising:

a first contour detection unit detecting contour points which determine a contour of the object of the first image when the first image and points adjacent boundary locations of the object of the first image are specified by a user; and a second contour detection unit detecting contour points of one of the subsequent images based on the contour points detected by said first contour detection unit so that object-contour data with respect to said one of the subsequent images is determined, wherein said second contour detection unit sets a detection range in said one of the subsequent images based on each of the contour points detected by said first contour detection unit, the detection range having a center placed at one of the contour points of the first image, and said second contour detection unit detects one of the contour points of said one of the subsequent images only within the detection range.

2. The image processing apparatus according to claim 1, further comprising a specification unit receiving data of the first image and the points adjacent the boundary locations of the object of the first image, said first contour detection unit detecting the contour points of the object of the first image by using the data from said specification unit.

3. The image processing apparatus according to claim 1, wherein said object-contour data comprises sets of a frame identification number and x and y coordinates of a location of a particular one of the contour points in a related image of the images, said object-contour data being accessed by said second contour detection unit.

4. The image processing apparatus according to claim 1, wherein said detection range is arranged in the shape of an ellipse in said one of the subsequent images, said ellipse having a major axis extending along the contour of the object of the first image.

5. The image processing apparatus according to claim 1, wherein said detection range is arranged in the shape of an ellipse in said one of the subsequent images, said ellipse having a major axis which interconnects two of the contour points detected by said first contour detection unit.

6. The image processing apparatus according to claim 1, further comprising a smoothing unit smoothing the contour of the object which has been detected by one of the first contour detection unit and the second contour detection unit.

7. The image processing apparatus according to claim 1, further comprising a contour determination unit which includes:

a convergence detection unit detecting a convergence of the object-contour detected by the second contour detection unit; and a detection process stopping unit stopping the object-contour detection of the second contour detection unit when the convergence of the object-contour is detected.

8. The image processing apparatus according to claim 1, further comprising a contour determination unit which includes:

a change-of-scene detection unit detecting whether a difference between image data of a contour of a preceding image and image data of a contour of a following image is greater than a predetermined value; and a detection process stopping unit stopping the object-contour detection of the second contour detection unit when the difference is detected to be greater than the predetermined value.

9. The image processing apparatus according to claim 1, further comprising a contour determination unit which includes:

a contour connection detection unit detecting whether the contour detected by the second contour detection unit is connected to an edge of a frame; and a detection process stopping unit stopping the object-contour detection of the second contour detection unit when the contour is detected to be connected to the edge of the frame.

10. The image processing apparatus according to claim 1, further comprising:

a contour inside specification unit receiving data of a contour inside point when the contour inside point has been specified by a user; and an object extraction unit uniformly filling the inside of the contour with image data by using the data from said contour inside specification unit.

11. An image processing method for detecting a contour of an object from a sequence of images wherein the images include a first image containing the object and a second image containing the object, said method comprising the steps of:

a first step wherein, when points adjacent boundary locations of the object of the first image are specified by a user, a first detection range in the first image is set for each of the specified points;

a second step wherein a boundary point within each of the first detection ranges set in the first step is detected;

a third step wherein a contour point on the object-contour of the first image is detected based on two of the boundary points detected in the second step, so that the object-contour of the first image is determined by the contour points detected for all the boundary points;

a fourth step wherein a second detection range, having a center placed at one of the contour points detected in the third step with respect to the first image, in the second image is set for each of the contour points detected in the third step with respect to the first image;

a fifth step wherein a contour point within each of the second detection ranges set in the fourth step is detected; and a sixth step wherein the contour of the object of the second image is detected by the contour points detected in the fifth step.

12. A method of detecting a contour of an object from a sequence of images, comprising:

detecting contour points which determine a contour of the object of a first image specified by a user; and detecting contour points of one of a plurality of subsequent images based on the contour points of the first image by setting a detection range in the one of the plurality of subsequent images based on each of the contour points detected with respect to the first image, the detection range having a center placed at one of the contour points of the first image, to detect one of the contour points of the one of the plurality of subsequent images only within the detection range.

13. A device detecting a contour of an object from a sequence of images, comprising:

means for detecting contour points which determine a contour of the object of a first image specified by a user; and means for detecting contour points of one of a plurality of subsequent images based on the contour points of the first image by setting a detection range in the one of the plurality of subsequent images based on each of the contour points detected with respect to the first image, the detection range having a center placed at one of the contour points of the first image, to detect one of the contour points of the one of the plurality of subsequent images only within the detection range.

* * * * *